(12) United States Patent
Snyder et al.

(10) Patent No.: US 10,859,089 B2
(45) Date of Patent: Dec. 8, 2020

(54) INTEGRATED OIL SYSTEM MANIFOLD

(71) Applicant: Atlas Copco Comptec LLC, Voorheesville, NY (US)

(72) Inventors: Ross Morgan Snyder, Schenectady, NY (US); Jeffrey Russell Whitehouse, Albany, NY (US)

(73) Assignee: ATLAS COPCO COMPTEC LLC, Voorheesville, NY (US)

( * ) Notice: Subject to any disclaimer, the term of this patent is extended or adjusted under 35 U.S.C. 154(b) by 249 days.

(21) Appl. No.: 15/715,879

(22) Filed: Sep. 26, 2017

(65) Prior Publication Data

US 2018/0087520 A1  Mar. 29, 2018

Related U.S. Application Data

(60) Provisional application No. 62/400,374, filed on Sep. 27, 2016.

(51) Int. Cl.
| | |
|---|---|
| *F04D 29/063* | (2006.01) |
| *F04D 29/48* | (2006.01) |
| *F16N 13/22* | (2006.01) |
| *F16N 39/02* | (2006.01) |
| *F16N 39/06* | (2006.01) |

(52) U.S. Cl.
CPC ......... *F04D 29/063* (2013.01); *F04D 29/486* (2013.01); *F16N 13/22* (2013.01); *F16N 39/02* (2013.01); *F16N 39/06* (2013.01); *F16N 2210/16* (2013.01)

(58) Field of Classification Search
CPC .. F04C 28/28; F04C 2270/72; F04C 18/0215; F04C 28/26; F04C 29/126
USPC ......................................................... 184/6.1
See application file for complete search history.

(56) References Cited

U.S. PATENT DOCUMENTS 3,080,716 A * 3/1963 Cummings ............... F02C 7/14
                                                     60/736
3,976,165 A * 8/1976 Pilarczyk .............. F01D 25/186
                                                     184/6.16

(Continued)

FOREIGN PATENT DOCUMENTS

| CN | 201953610 U | 8/2011 |
| CN | 104613033 A | 5/2015 |

OTHER PUBLICATIONS

International Search Report and Written Opinion for PCT Application No. PCT/US2017/053212, dated Dec. 29, 2017.

(Continued)

*Primary Examiner* — Henry Y Liu
(74) *Attorney, Agent, or Firm* — Schmeiser, Olsen & Watts, LLP

(57) ABSTRACT

An integrated oil system manifold is provided, which includes a reverse rotation protection element, a main pump check valve, an auxiliary pump check valve, and a pressure relief valve, wherein the reverse rotation protection element, the main pump check valve, the auxiliary pump check valve, and the pressure relief valve are integrated with a housing of the integrated oil system manifold. Furthermore, a temperature control element, a filter, a heat exchanger, an integral main pump assembly, and an integral auxiliary pump assembly may also be included in the integrated manifold. An associated method is also provided.

20 Claims, 36 Drawing Sheets

(56) References Cited

U.S. PATENT DOCUMENTS

| | | | | |
|---|---|---|---|---|
| 4,057,371 A | * | 11/1977 | Pilarczyk | F01D 25/166 417/409 |
| 4,231,716 A | * | 11/1980 | Kubota | F04B 7/06 184/35 |
| 4,969,796 A | * | 11/1990 | Wescott | F16J 15/162 415/110 |
| 5,199,528 A | * | 4/1993 | Rinaldo | F01M 1/18 137/599.01 |
| 5,320,507 A | * | 6/1994 | Monnier | F04C 18/0215 418/55.6 |
| 5,588,503 A | * | 12/1996 | Rinaldo | F01M 1/18 137/112 |
| 5,593,294 A | * | 1/1997 | Houghtby | F04C 28/28 188/82.6 |
| 5,607,288 A | * | 3/1997 | Wallis | F04C 18/0215 417/310 |
| 5,613,361 A | * | 3/1997 | Dantlgraber | B29C 45/82 60/427 |
| 5,800,141 A | * | 9/1998 | Ceylan | F04C 28/28 418/55.1 |
| 5,803,716 A | * | 9/1998 | Wallis | F04C 18/0215 417/310 |
| 6,095,764 A | * | 8/2000 | Shibamoto | F04C 29/126 417/310 |
| 6,772,802 B2 | * | 8/2004 | Few | B60S 5/00 141/18 |
| 7,654,251 B2 | * | 2/2010 | Jones | F02B 33/40 123/559.1 |
| 7,854,299 B2 | * | 12/2010 | Czechowski | F16N 39/02 184/6 |
| 8,496,089 B2 | | 7/2013 | Czechowski et al. | |
| 8,979,509 B2 | * | 3/2015 | Matsumoto | F04C 18/086 417/410.4 |
| 9,194,395 B2 | * | 11/2015 | Ginies | F04C 18/0215 |
| 2006/0070810 A1 | * | 4/2006 | Coppins | F16N 7/38 184/6.1 |
| 2011/0097216 A1 | * | 4/2011 | Kuzdzal | F04B 39/0207 417/53 |
| 2014/0356123 A1 | * | 12/2014 | Gerber | F04D 29/06 415/1 |
| 2018/0080448 A1 | * | 3/2018 | Ma | F04C 18/0215 |

OTHER PUBLICATIONS

Translation of the first Chinese Office Action for CN Application No. 201721251311.0, dated Apr. 3, 2018.

Korean Office Action for application No. 10-2019-7011925 dated Jun. 3, 2019.

* cited by examiner

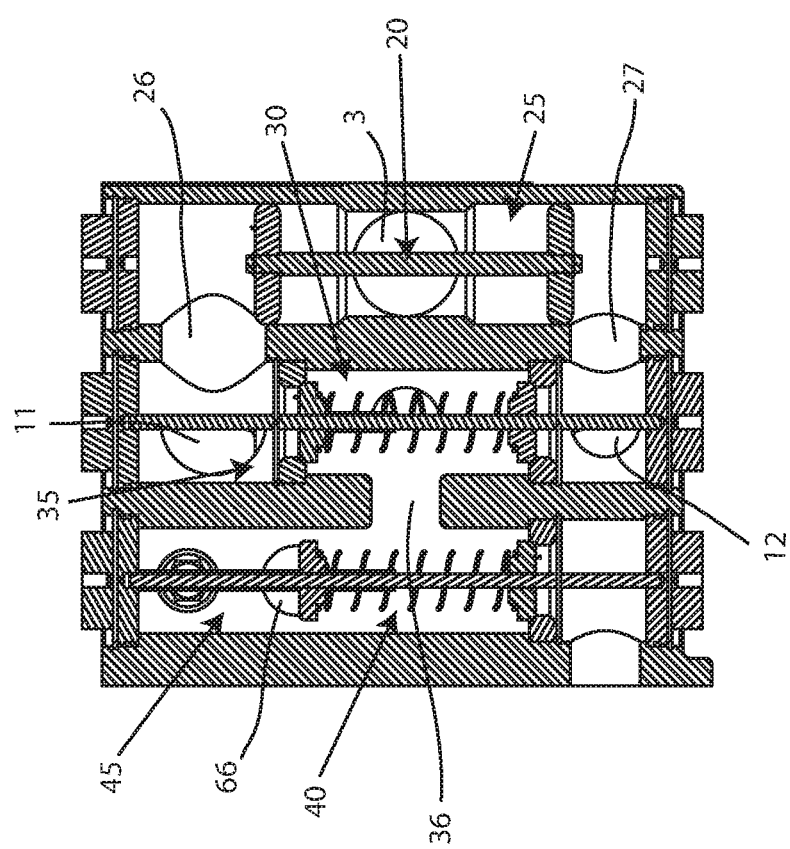

INTEGRATED OIL SYSTEM MANIFOLD

CROSS-REFERENCE TO RELATED APPLICATIONS

This application claims priority to and the benefit of U.S. Provisional Application No. 62/400,374, filed Sep. 27, 2016, and entitled "Integrated Oil System Manifold," the entire contents of which are hereby incorporated by reference.

FIELD OF TECHNOLOGY

The following relates to a machine lubrication oil system, and more specifically to embodiments of a compressor lubricating system design that delivers and processes oil within a package arrangement. It is particularly applicable to machinery that may rotate in both a normal and reverse direction.

BACKGROUND

Current oil delivery systems for machinery, such as compressors, require numerous components to be installed. Each component of the oil system takes up valuable space at the installation site, and adds to the complexity of the installation. Further, high costs are associated with specifying, purchasing, and connecting the numerous components, as well as the installation of the system.

Thus, a need exists for an apparatus and method for combining the numerous components associated with the oil delivery systems into a functional manifold assembly.

SUMMARY

A first aspect relates generally to an integrated oil system manifold, comprising: a reverse rotation protection element, a main pump check valve, an auxiliary pump check valve, and a pressure relief valve, wherein the main pump check valve, the auxiliary pump check valve, the pressure relief valve, and the reverse rotation protection element are integrated with a housing of the integrated oil system manifold.

A second aspect relates generally to an integrated oil system manifold, comprising: a reverse rotation protection element, a main pump check valve, a pump assembly, wherein the main pump check valve, the reverse rotation protection element and the pump assembly are integrated with a housing of the integrated oil system manifold.

A third aspect relates generally to a method for delivering lubrication oil to a machine, the method comprising: integrating a reverse rotation protection element, a main pump check valve, an auxiliary pump check valve, a pressure relief valve in a single housing, the housing being in fluid communication with the machine, in an operable position, wherein actuation of a pump assembly associated with the housing supplies a lubrication oil to the machine, the lubrication oil flowing through the housing.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein:

FIG. 3G depicts a sectional view of an embodiment of the integrated oil system manifold;

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Figure 1:
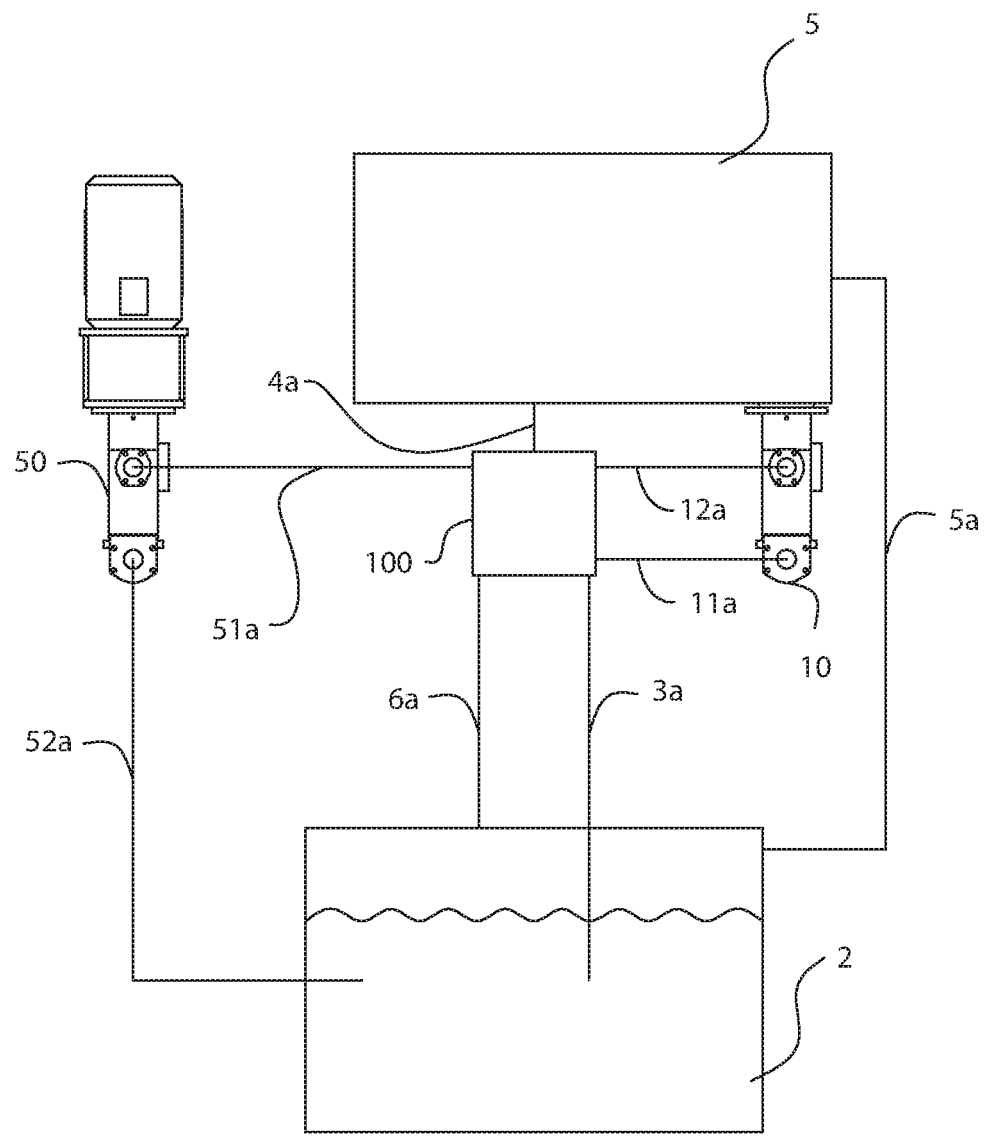
FIG. 1 depicts a schematic view of an integrated oil system manifold.
Figure 2:
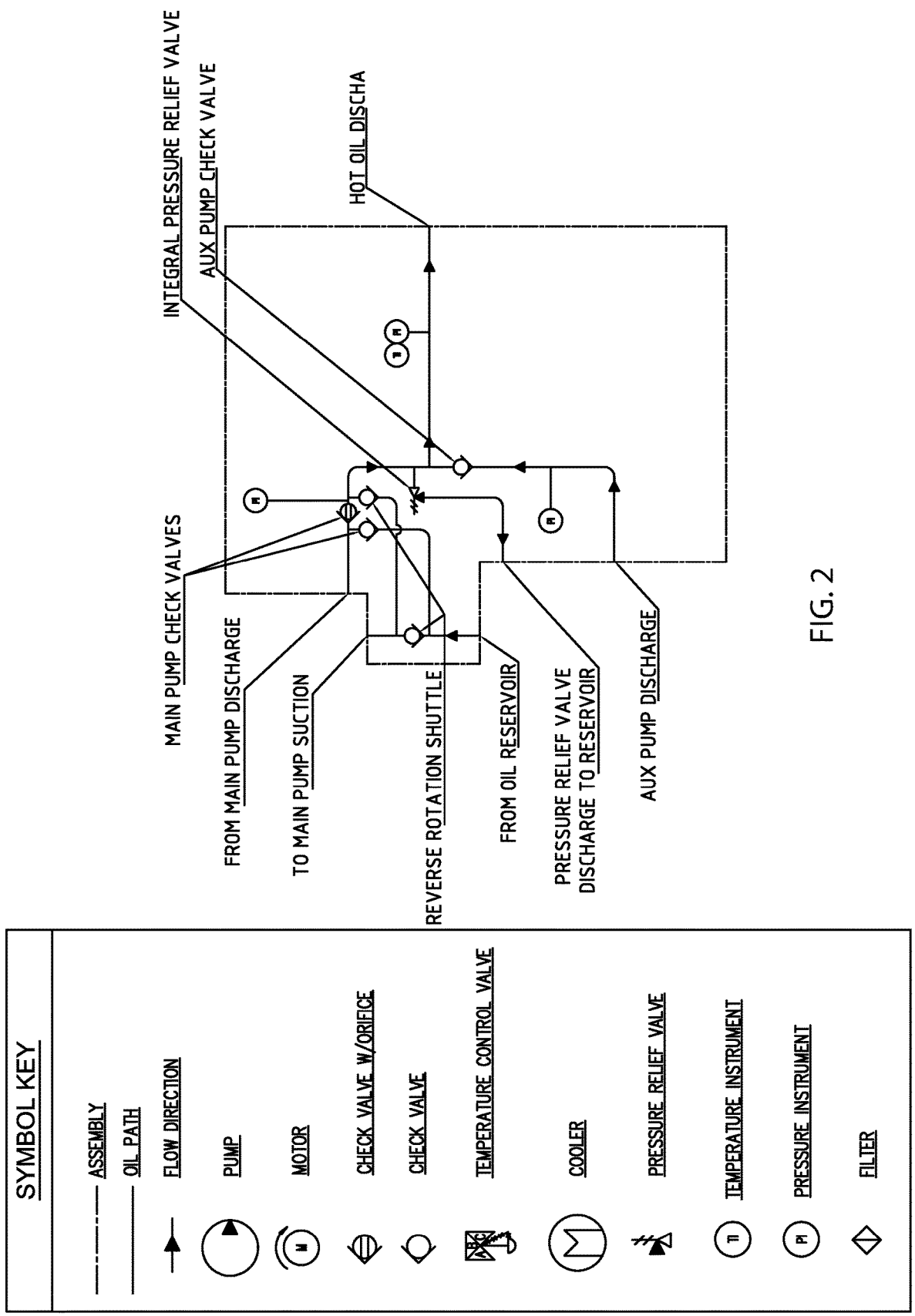
FIG. 2 depicts a schematic diagram of a first embodiment of the integrated oil system manifold.

Referring to the drawings, FIGS. 1-2 depict a first embodiment of an integrated oil system manifold 100. Embodiments of the integrated oil system manifold 100 may be an oil delivery system manifold, an oil system, an oil delivery system, a lube oil system manifold, an integrated oil system, a machine lubricant supply system, a compressor lubricant system, a compressor lubricating oil system manifold, and the like. Embodiments of the integrated oil system manifold 100 may be used in conjunction with machinery, such as a centrifugal compressor. For example, the integrated oil system manifold 100 may deliver, supply, or otherwise provide oil, such as compressor lubricating oil, to the compressor for lubrication. The integrated oil system manifold 100 may also be used in conjunction with other machines, such as an electric motor, internal combustion engine, drive means, centrifugal compressor, fan, pump, conveyors, rotating machines, machines having moving components, and the like. It is particularly applicable to machinery that can rotate in both a normal and reverse direction, and that has an oil pump connected to the machine. Such machines include, but are not limited to, compressors or pumps which may be driven backwards by the flow of fluid when there is a power failure and there is no check valve or said valve has failed, and conveyors which may run backwards when there is a power failure and the brake does not engage.

Moreover, embodiments of the integrated oil system manifold 100 may include one or more oil system components in a single manifold assembly. In other words, embodiments of the integrated oil system manifold 100 may reduce a number of oil system components contained within an overall oil system for a machine, such as a compressor. Separate oil system components take up additional physical space at an installation site, add to a complexity of the design, and increase costs associated with the oil system. Examples of oil system components that may be integrated into the oil system manifold 100 may include a reverse rotation protection element, check valve(s), a pressure relief valve, thermostatic element(s), heat exchanger(s), oil filter(s), regulators, and pump(s). Combining such components in an integrated oil system manifold 100 as shown and described herein accomplishes several additional advantages. For example, embodiments of the oil system manifold 100 may limit or eliminate the length of piping required for assembly, which reduces leak potential due to an elimination of pipe joints and other connections along the pipeline, and can lead to a reduction in system pressure drops due to the small distances between components and the elimination of associated piping. The oil system manifold 100 uses less material, including hardware and brackets, as well as limits a machine footprint. Due to the limited size and footprint, maintenance may be less burdensome, including painting and painting preparation. Further, embodiments of the integrated oil system manifold 100 may reduce assembly time and cost, simplify oil system diagrams, reduce engineering time and costs, increase reliability due to a standardization of design, and reduce a risk of oil system contamination from welding of pipes, deterioration of hoses, etc.

FIGS. 1 and 2 depict schematic diagrams of a first embodiment of the integrated oil system manifold 100. The integrated oil system manifold 100 may include a housing 1. Embodiments of the housing 1 may be a block, an enclosure, a manifold, an assembly, a machined block, a machined manifold, a cast manifold, a machined assembly, a flow controller, an oil flow controller, a controller, a compressor lube oil controller, and the like. Embodiments of the manifold 100, and components therein, may be constructed from any materials necessary to withstand a variety of operating and ambient conditions. The manifold 100 may be adapted to function with any flow rate so that both smaller and larger system can utilize the manifold 100. Further, embodiments of the manifold 100 may be integrated into a machine, such as a compressor gearbox, further minimizing the footprint of a compressor in the field.

The integrated oil system manifold 100 may be in fluid communication with a main pump 10, an auxiliary pump 50, an oil reservoir 2, and a machine 5, such as a compressor. The manifold 100 may be in fluid communication with the main pump 10, the auxiliary pump 50, the oil reservoir 2, and the machine 5 via one or more lines, pipes, and the like. The pumps 10, 50 may draw oil from the oil reservoir 2 into the housing 1, and ultimately deliver the oil, under pressure, to the machine 5 for lubrication of the machine 5 and its parts/components. However, the oil delivery process is performed through the integrated oil system manifold 100 having multiple oil system components integrated with the single housing 1.

Referring now to FIGS. 3A and 3D-3J, embodiments of the integrated oil system manifold 100 may include a housing 1, a reverse rotation protection element 20, a main check valve 30, an auxiliary check valve 40, and a pressure relief valve 9. Embodiments of the integrated oil system manifold 100 may further include one or more pressure, temperature or other instrument taps 7a, 7b, 7c. In the rest position shown in FIG. 3A, the pumps 10, 50 may not be actively operating to create a pressure differential within the system. In other words, in the rest position, no oil is flowing through the housing 1 via actuation of the pumps 10, 50.

Embodiments of the manifold 100 may include a pump inlet 11. Embodiments of the pump inlet 11 may be an opening, a port, an outlet, an orifice, a gate, a bore, a hole, and the like. The pump inlet 11 may be associated with a suction line 11a of the main pump 10. The pump inlet 11 may be located on an exterior surface of the housing 1 to create an inlet/outlet path for oil passing into/out of the housing 1. Embodiments of the manifold 100 may include a pump outlet 12. Embodiments of the pump outlet 12 may be an opening, a port, an outlet, an orifice, a gate, a bore, a hole, and the like. The pump outlet 12 may be associated with a discharge line 12a of the main pump 10. The pump outlet 12 may be located on an exterior surface of the housing 1 to create an inlet/outlet path for oil passing into/out of the housing 1. In other embodiments, the pump inlet 11 and the pump outlet 12 may be located in a second fluid pathway 35. Furthermore, a reverse rotation protection element 20 may be disposed between the pump inlet 11 and the pump outlet 12, within a first fluid pathway 25 within the housing 1. Embodiments of the reverse rotation protection element 20 may be a shuttle, opposing check valves or check balls, and the like. In an exemplary embodiment, the reverse rotation protection element 20 may include a shuttle that has a first valve disc 21 and a second valve disc 22 positioned a distance from each other by a valve stem or rod. The first valve disc 21 and the second valve disc 22 may have a diameter corresponding to a diameter (or cross-sectional area) of the first fluid pathway 25. The first fluid pathway 25 may extend from one end of the housing 1 to the opposing end of the housing 1, and may be configured to receive oil and accommodate the flow of oil as described herein. Embodiments of the first fluid pathway 25 may be an opening, a channel, a path, a fluid path, a passage, a bore, a tunnel, and the like. The valve disks 21 and 22 may have sufficiently small clearance to the walls of first fluid pathway 25 so that no valve seats are needed. When valve seats are not used, the movement of reverse rotation protection element 20 may be limited by the ends of passage 25 or by pins or other features. However, in an exemplary embodiment, a first valve seat 23 and a second valve seat 24 may be disposed between the pump inlet 11 and the pump outlet 12 along an inner surface of the pathway 25. Embodiments of the valve seats 23, 24 may be a seat, a valve seat, an annular lip, an annular flange, a ramped surface, a radially inwardly extending protrusion, and the like, or may be a separate piece that extends radially inward (or inwardly) into the first fluid pathway 25 to define a surface for contacting the first valve disc 21 and the second valve disc 22, respectively. In the rest position, the first valve disc 21 may not make contact with the first valve seat 23, and likewise the second valve disc 22 may not make contact with the second valve seat 24. Whenever the main pump 10 is not operating, the position of the reverse rotation protection element 20 is not determinate, and may be in the position shown in FIG. 3A, 3B, 3C, or some intermediate position.

Furthermore, embodiments of the integrated oil system manifold 100 may include an oil reservoir port 3. The oil reservoir port 3 may be located within or in communication with the first fluid pathway 25, and may be disposed between the pump inlet 11 and the pump outlet 12. Embodiments of the oil reservoir port 3 may be an opening, a port, an outlet, an orifice, a gate, a bore, a hole, and the like. The oil reservoir port 3 may be associated with a line or pipe 3a connecting the oil reservoir 2 to the housing 1. The oil reservoir port 3 may be located on an exterior surface of the housing 1 to create an inlet path for oil passing into the housing 1.

Figure 3A:
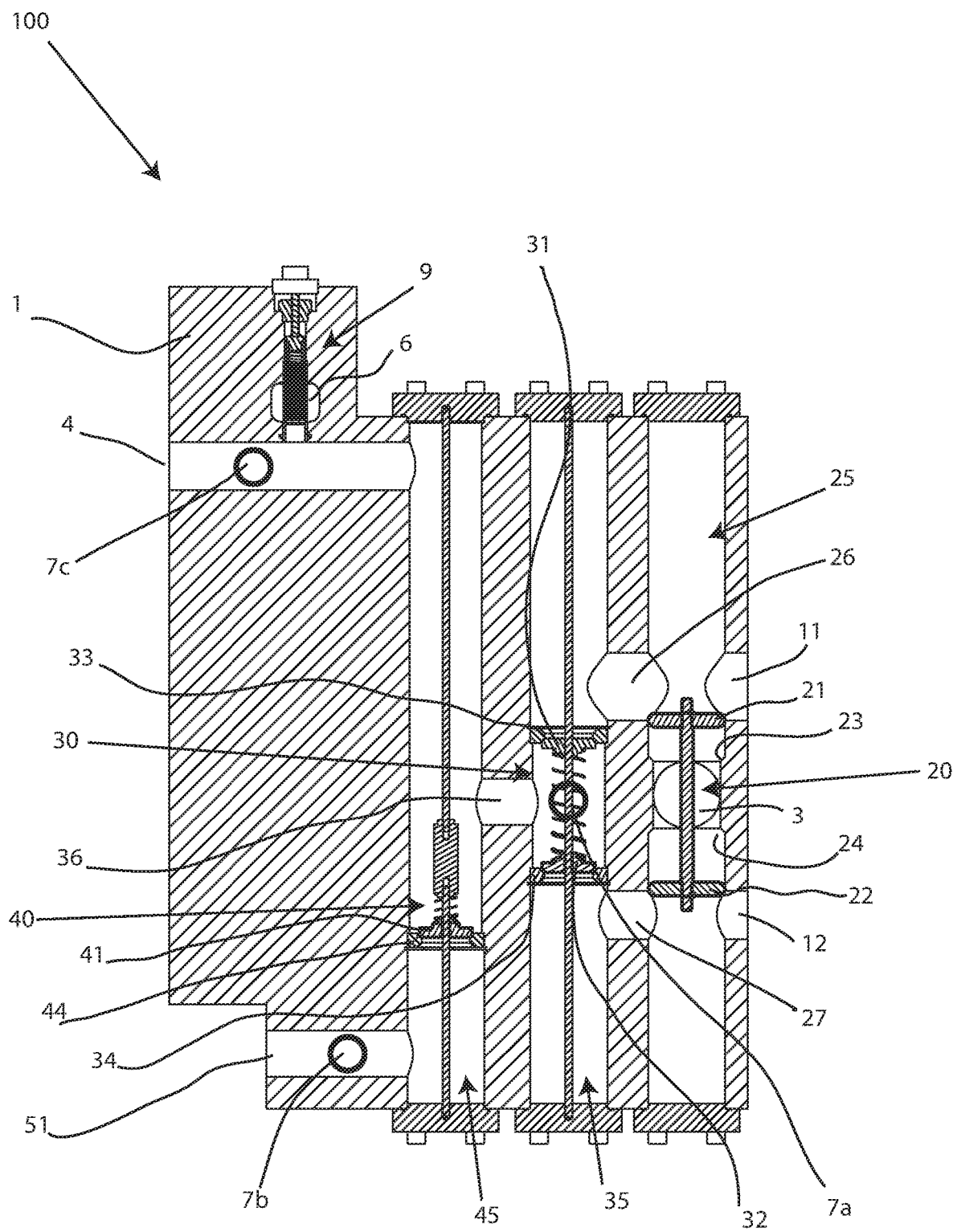
FIG. 3A depicts a cross-sectional view of the first embodiment of the integrated oil system manifold in a rest position.

Referring still to FIG. 3A, embodiments of the manifold 100 may include a first connection passage 26 and a second connection passage 27 within the housing 1. Embodiments of the first connection passage 26 and the second connection passage 27 may be an opening, a port, an outlet, an orifice, a gate, a bore, a hole, and the like. The first connection passage 26 may be disposed proximate the pump inlet 11, and may provide a passage between the first fluid pathway 25 and the second fluid pathway 35. The first connection passage 26 may be located on a side beyond the first valve disc 21 of the reverse rotation protection element 20, while the second connection passage 27 may be located on a side beyond the second valve disc 22 (i.e. on either side of the reverse rotation protection element 20). Moreover, embodiments of the integrated oil system manifold 100 may include a main pump check valve 30. Embodiments of the main pump check valve 30 may be disposed between the first connection passage 26 and the second connection passage 27, within a second fluid pathway 35 within the housing 1. Embodiments of the main pump check valve 30 may include two independent check valves that allow flow towards a common area. Embodiments of the main pump check valve 30 may include a first valve disc 31 and a second valve disc 32 positioned a distance from each other. Embodiments of valve discs 31, 32 may be a disk, ball, piston, plunger, flap, and the like. While valve discs 31 and 32 are shown mounted on a rod that can support and guide them, such a rod, may, in some embodiments, be omitted. There may be a spring or other biasing element(s) acting on valve discs 31 and 32, and such a spring may surround a stem or rod associated with valve disks 31, 32. The first valve disc 31 and the second valve disc 32 may have a diameter less than a diameter (or cross-sectional area) of the second fluid pathway 35 so that oil can flow between the discs 31, 32 and the inner surface of the pathway 35 in a non-rest position. The second fluid pathway 35 may extend from one end of the housing 1 to the opposing end of the housing 1, and may be configured to receive oil and accommodate the flow of oil as described herein. Embodiments of the second fluid pathway 35 may be an opening, a channel, a path, a fluid path, a passage, a bore, a tunnel, and the like, and may be in fluid communication with the first fluid pathway 25 and a third fluid pathway 45. A first valve seat 33 and a second valve seat 34 may be disposed between the first connection passage 26 and the second connection passage 27 along an inner surface of the pathway 35. Embodiments of the valve seats 33, 34 may be a seat, a valve seat, an annular lip, a ramped surface, an annular flange, a radially inwardly extending protrusion, and the like, or a separate piece located in pathway 35 that extends radially inward (or inwardly) into the second fluid pathway 35 to define a surface for contacting the first valve disc 31 and the second valve disc 32, respectively. In the rest position, the first valve disc 31 makes contact with (or resides very close to) the first valve seat 33, and likewise the second valve disc 32 makes contact with (or resides very close to) the second valve seat 34.

Embodiments of the manifold 100 may further include a third connection passage 36 within the housing 1. Embodiments of the third connection passage 36 may be an opening, a port, an outlet, an orifice, a gate, a bore, a hole, and the like. The third connection passage 36 may be disposed between the first valve seat 33 and the second valve seat 34 associated with the main pump check valve 30, and may provide a passage between the second fluid pathway 35 and the third fluid pathway 45. The third fluid pathway 45 may extend from one end of the housing 1 to the opposing end of the housing 1, and may be configured to receive oil and accommodate the flow of oil as described herein. Embodiments of the third fluid pathway 45 may be an opening, a channel, a path, a fluid path, a passage, a bore, a tunnel, and the like, and may be in fluid communication with the second fluid pathway 35. At least one pressure, temperature or other instrument tap 7a may also be positioned within the second fluid pathway 35 between valve seats 31 and 32.

Furthermore, embodiments of the integrated oil system manifold 100 may include an auxiliary pump port 51. Embodiments of the auxiliary pump port 51 may be one or more openings, ports, outlets, orifices, gates, bores, passageways, pathways, holes, and the like. The auxiliary pump port 51 may be associated with a line or pipe 51a connecting the auxiliary pump 50 to the housing 1. The auxiliary pump port 51 may be located within or in communication with the third fluid pathway 45 and may be disposed on a first side of the third connection passage 36. The auxiliary pump port 51 may be located on an exterior surface of the housing 1 to create an inlet path for oil passing into the housing 1. Moreover, embodiments of the integrated oil system manifold 100 may include an auxiliary pump check valve 40. Embodiments of the auxiliary pump check valve 40 may be disposed within the third fluid pathway 45 between auxiliary pump port 51 and third connection passage 36, all within the housing 1. Embodiments of the auxiliary pump check valve 40 may include a valve disc 41. Embodiments of valve disc 41 may be a disk, ball, piston, plunger, flap, and the like. While valve disc 41 is shown mounted on a stem or rod that can support and guide it, such a stem or rod may, in some embodiments, be omitted. Valve disk 41 may also be associated with a spring or other biasing element. The valve disc 41 may have a diameter less than a diameter (or cross-sectional area) of the third fluid pathway 45 so that oil can flow between the disc 41 and the inner surface of the pathway 45 in a non-rest position. A third valve seat 44 may be disposed to one side of the third connection passage 36, along an inner surface of the third fluid pathway 45. Embodiments of the third valve seat 44 may be a seat, a valve seat, an annular lip, a ramped surface, an annular flange, a radially inwardly extending protrusion, and the like, that extends radially inward (or inwardly) into the third fluid pathway 45 to define a surface for contacting the valve disc 41 of the auxiliary pump check valve 40. In the rest position, the valve disc 41 makes contact with (or resides very close to) the second valve seat 44. Additionally, embodiments of the integrated oil system manifold 100 may include a discharge port 4. Embodiments of the discharge port 4 may be an opening, a port, an outlet, an orifice, a gate, a bore a passageway, a pathway, a hole, and the like. The discharge port 4 may be associated with a line or pipe 4a connecting the housing 1 to the machine 5, or various other desired delivery destinations for the oil drawn from the oil reservoir 2. The discharge port 4 may be disposed on a second side of the third connection passage 36, opposite the first side where the auxiliary pump port 51 is located, towards a distal end of the third fluid pathway 45. The discharge port 4 may be located on an exterior surface of the housing 1 to create an outlet path for oil passing out of the housing 1. One or more pressure, temperature or other instrument taps 7b may be disposed within the auxiliary pump port 51. Also, one or more pressure, temperature or other instrument taps 7c may be disposed within the discharge port 4.

Embodiments of the manifold 100 may include a pressure relief valve 9. The pressure relief valve 9 may be disposed proximate the discharge port 4, or otherwise in fluid communication with third connection passage 36, but integrated with the housing 1. For instance, an inlet passage of the pressure relief valve 9 may be fluidly connected to the discharge port 4. Embodiments of the pressure relief valve 9 may be used to control, limit, or regulate a pressure that can build up in the manifold 100 at a location proximate the discharge of oil from the housing 1. The pressure relief valve 9 may relieve built up pressure by allowing pressurized oil to exit the housing 1 via a secondary outlet passage 6 to the oil reservoir 2. The secondary outlet passage 6 may be associated with a line or pipe 6a connecting the housing 1 to the oil reservoir 2. Additional pressure relief valves may be incorporated into the manifold 100, such as individual relief valves at each pump discharge per requirements of some of the standards published by the American Petroleum Institute (API). In some embodiments, the pressure relive valve 9 may be operably coupled to the housing, for example, coupled or otherwise attached to the housing 1, external to the housing 1.

Figure 3B:
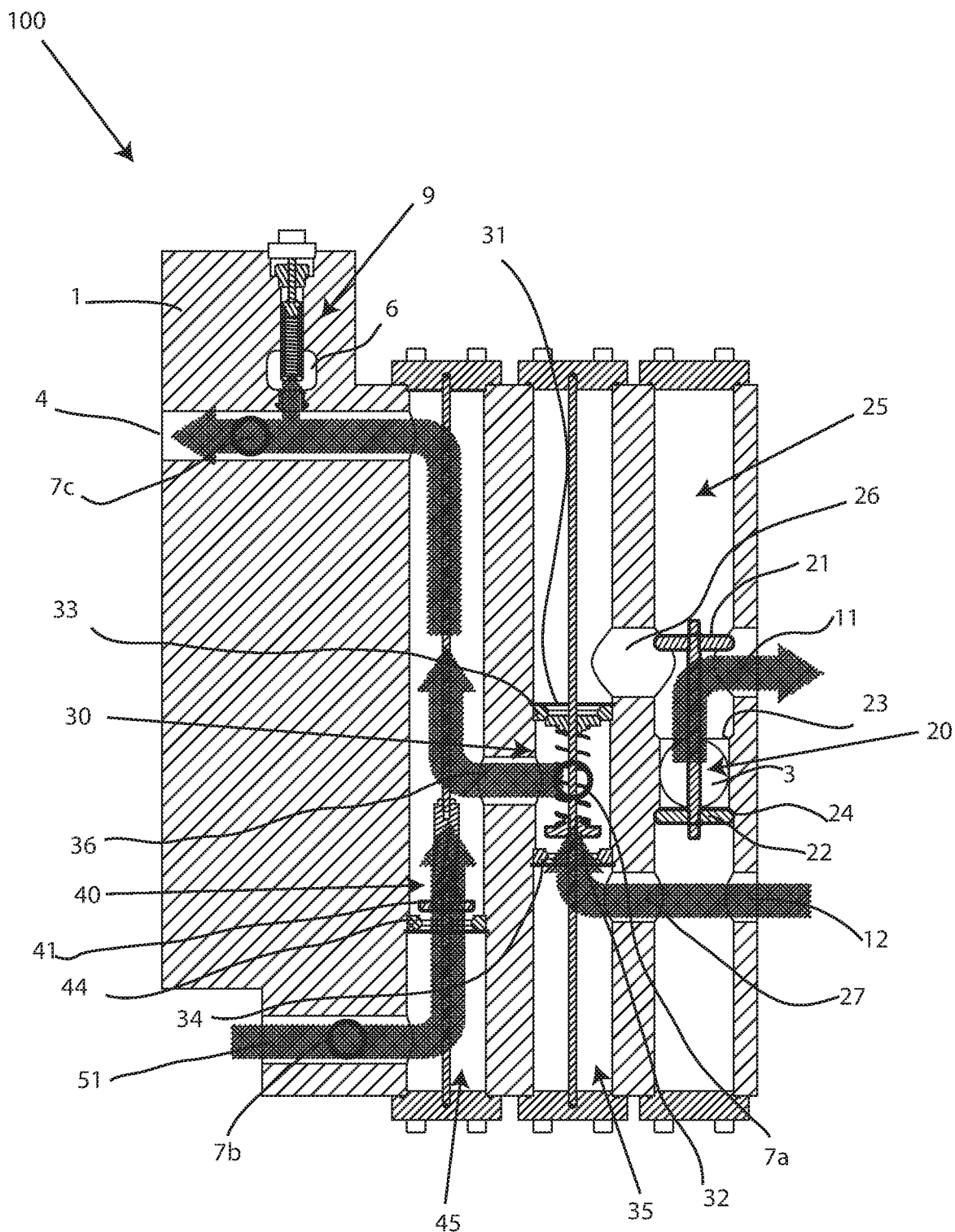
FIG. 3B depicts a cross-sectional view of the first embodiment of the integrated oil system manifold in a first operating position.
Figure 3C:
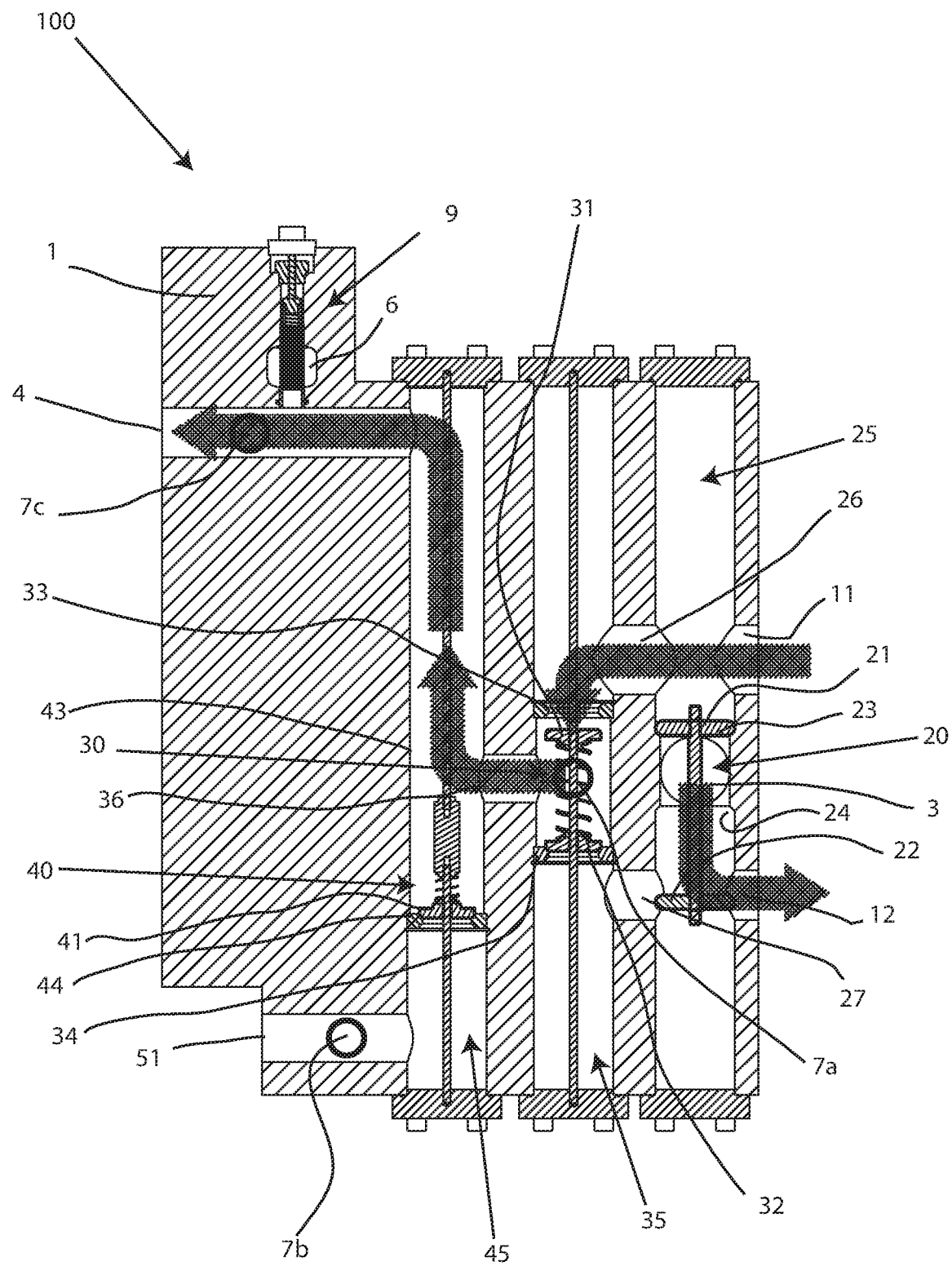
FIG. 3C depicts a cross-sectional view of the first embodiment of the integrated oil system manifold in a second operating position.
Figure 3D:
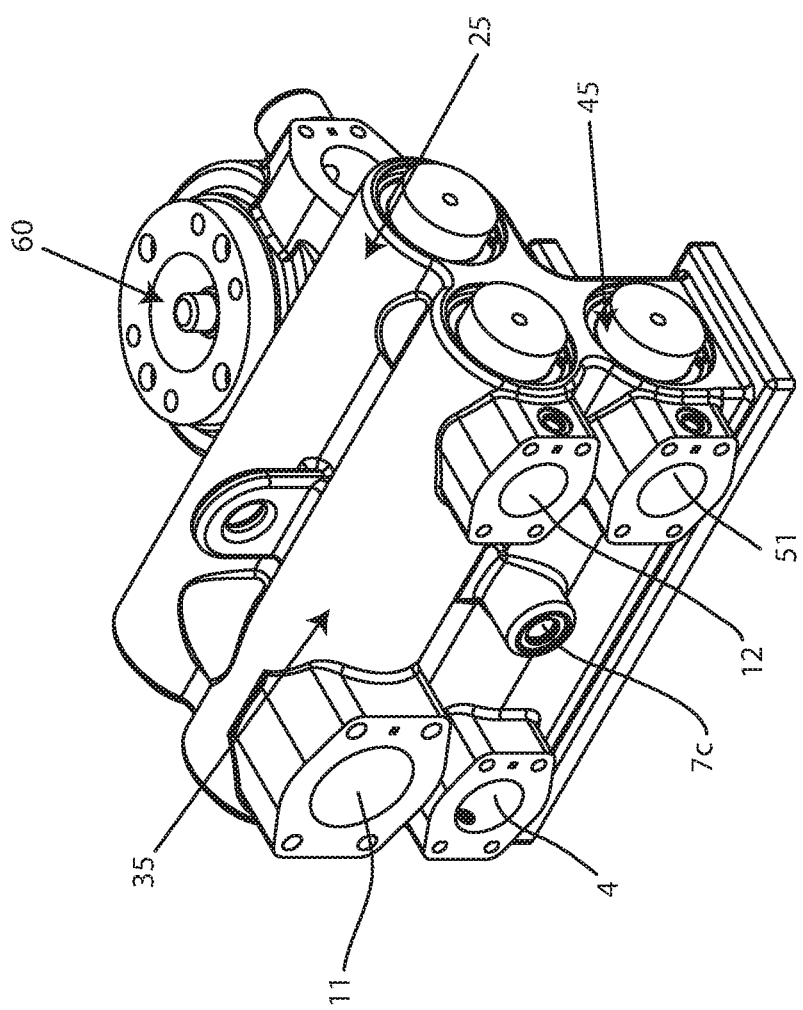
FIG. 3D depicts a front, perspective view of an embodiment of the integrated oil system manifold.
Figure 3E:
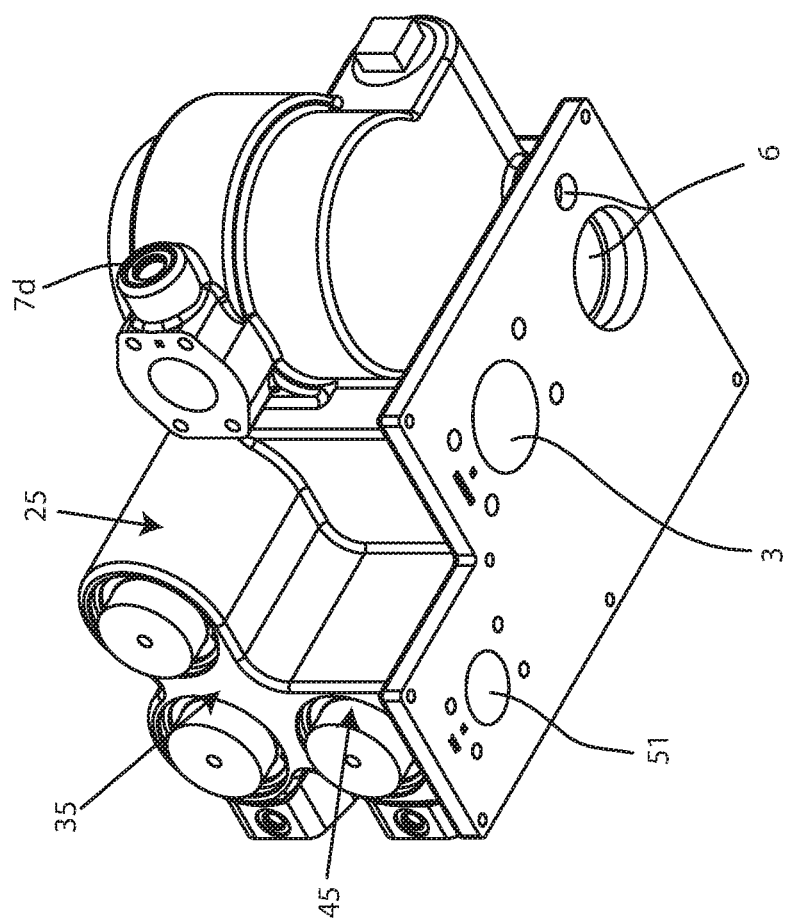
FIG. 3E depicts a bottom, perspective view of an embodiment of the integrated oil system manifold.
Figure 3F:
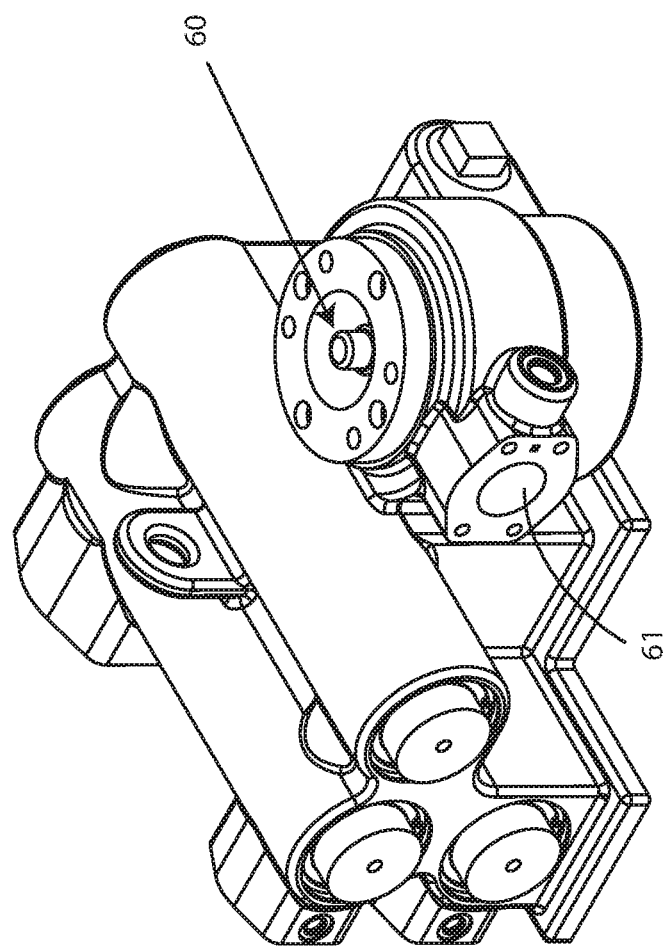
FIG. 3F depicts a rear, perspective view of an embodiment of the integrated oil system manifold.
Figure 3J:
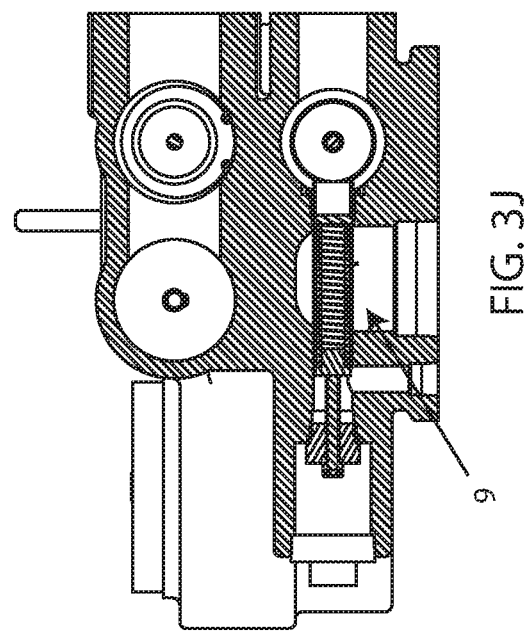
FIG. 3J depicts a sectional view along C-C as shown in FIG. 3I.
Figure 3H:
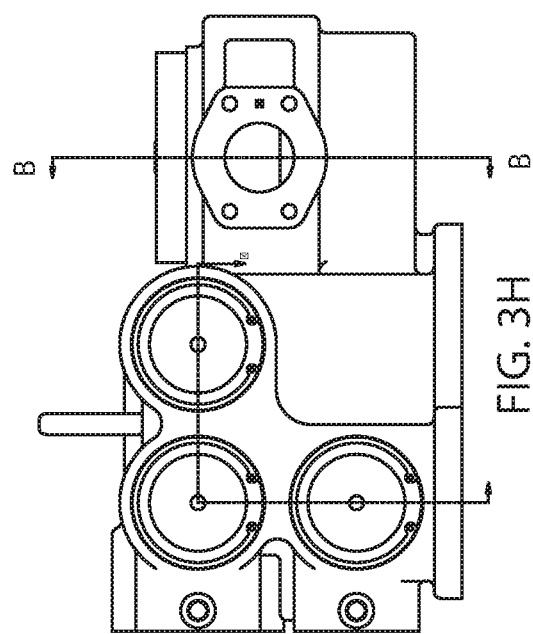
FIG. 3H depicts a side view of an embodiment of the integrated oil system manifold, having a section line B-B.
Figure 3I:
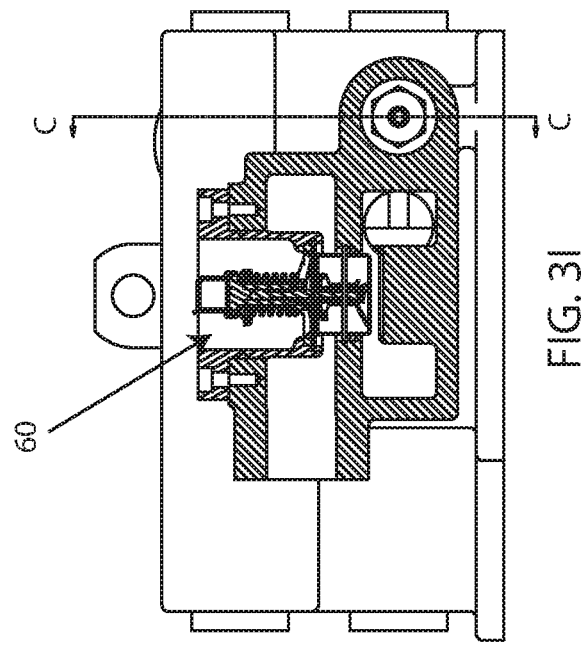
FIG. 3I depicts a sectional view along B-B as shown in FIG. 3H, having a section line C-C.

The manner in which a first embodiment of the integrated oil system manifold 100 can operate is described with reference to FIGS. 3A-3C. FIG. 3A depicts a first embodiment of the oil system manifold 100 in a rest position. FIG. 3B depicts a first embodiment of the oil system manifold 100 in a first operating position. FIG. 3C depicts a first embodiment of the oil system manifold 100 in a second operating position. The first operating position may be when the main pump 10 is operating in a normal direction and the auxiliary pump 50 is operating, and the second operating position may be when the main pump 10 is operating in a reverse direction and the auxiliary pump 50 is not operating. In some embodiments, a normal direction may be a forward direction, and the reverse direction may be an opposite direction.

As shown in FIG. 3B, the first embodiment of the manifold 100 is in the first operating position, wherein the main pump 10 is operating in a normal direction and the auxiliary pump 50 is operating. Because the main pump 10 is operating in a conventional, normal direction, a suction force acts to draw oil, or a similar lubricating fluid, from a fluid reservoir, such as oil reservoir 2, into the housing 1 through the oil reservoir port 3 and then through main pump inlet 11 into the main pump suction line 11a to reach the main pump 10. The suction force, or pressure differential caused by operation of the main pump 10, also urges the reverse rotation protection element 20 to displace such that the second valve disc 22 engages the second valve seat 24 while the first valve disk 21 is positioned to allow the free flow of oil from oil reservoir port 3 to main pump inlet 11. The main pump 10 may then discharge the oil via the main pump discharge line 12a into the housing 1 through the main pump outlet 12. The oil may flow into the available portion of the first fluid pathway 25 and into the second fluid pathway 35 through the second connection passage 27. Oil is prevented from flowing from second connection passage 27 (or pump outlet 12) back to oil reservoir port 3 by the second valve disc 22 that is engaged with the second valve seat 24. The pressure of the oil flowing though the housing 1 may urge the second valve disc 32 of the main pump check valve 30 toward the first valve disc 31, which creates a gap between the second valve disc 32 and the second valve seat 34 for the oil to flow; the flow of the oil may maintain the biasing force against the second valve disc 32. The force exerted against the first valve disc 31 may assist in keeping the first valve disc 31 seated against the first valve seat 33, which may prevent oil from flowing into other areas of the housing 1. The flow of oil may continue to the third fluid pathway 45 through the third connection passage 36 and towards the discharge port 4. The pressurized oil may exit the discharge port 4 and be delivered or otherwise provided to the machine 5 for lubrication. An additional oil supply may flow into housing 1 by operation of an auxiliary pump 50 via auxiliary pump line 51a through auxiliary pump port 51. This stream of oil can flow through auxiliary pump check valve 40 and be combined with the flow of oil from the main pump 10 in the third fluid pathway 45. Excess oil causing an unwanted pressure build up may be relieved by the pressure relief valve 9.

In some instances, the machine 5 may reverse rotation, causing the main pump 10 to operate in a reverse direction. This reversal of direction can cause harm to the machine 5 if oil is not supplied to the machine 5. However, the reverse rotation protection element 20 may accommodate a reverse in pump directions. As shown in FIG. 3C, the first embodiment of the manifold 100 is in the second operating position, wherein the main pump 10 is operating in a reverse direction and the auxiliary pump 50 is no longer operating. Because the main pump 10 is operating in a unconventional, reverse direction, a suction force acts to draw the oil from the oil reservoir 2 into the housing 1 through the oil reservoir port 3 and then through main pump outlet 12 into the main pump discharge line 12a to reach the main pump 10. The suction force, or pressure differential caused by reverse operation of the main pump 10 now urges the reverse rotation protection element 20 to displace such that the first valve disc 21 engages the first valve seat 23, while the second valve disk 22 is positioned to allow the free flow of oil from oil reservoir port 3 to main pump outlet 12. The main pump 10 may then discharge the oil via the main pump suction line 11a into the housing 1 through the main pump inlet 11. The oil may flow into the available portion of the first fluid pathway 25 and into the second fluid pathway 35 through the first connection passage 26. Oil is prevented from flowing from first connection passage 26 (or oil pump inlet 11) back to oil reservoir port 3 by the first valve disc 21 that is engaged with the first valve seat 23. The pressure of the oil flowing though the housing 1 may urge the first valve disc 31 of the main pump check valve 30 toward the second valve disc 32, which creates a gap between the first valve disc 31 and the first valve seat 33 for the oil to flow; the flow of the oil may maintain the biasing force against the first valve disc 31. The force exerted against the second valve disc 32 may assist in keeping the second valve disc 32 seated against the second valve seat 34, which may prevent oil from flowing into other areas of the housing 1. The flow of oil may continue to the third fluid pathway 45 through the third connection passage 36 and towards the discharge port 4. The pressurized oil may exit the discharge port 4 and be delivered or otherwise provided to the machine 5 for lubrication. In this embodiment, the auxiliary pump 50 may be inoperable, and thus no additional oil supply may flow into housing 1, and the auxiliary pump check valve 40 may be closed, and the pressure relief valve 9 may also be closed.

Figure 4:
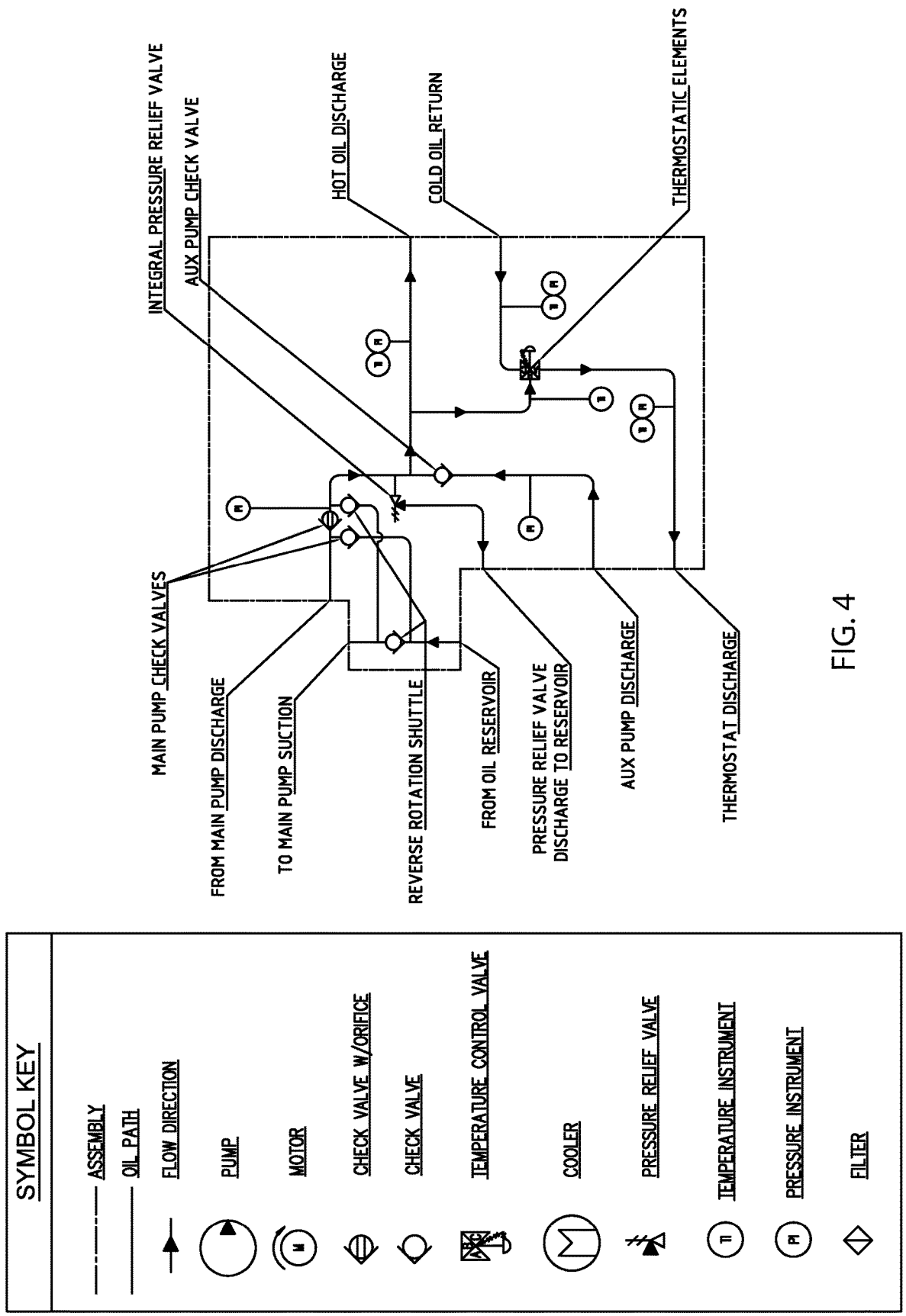
FIG. 4 depicts a schematic diagram of a second embodiment of the integrated oil system manifold.
Figure 5A:
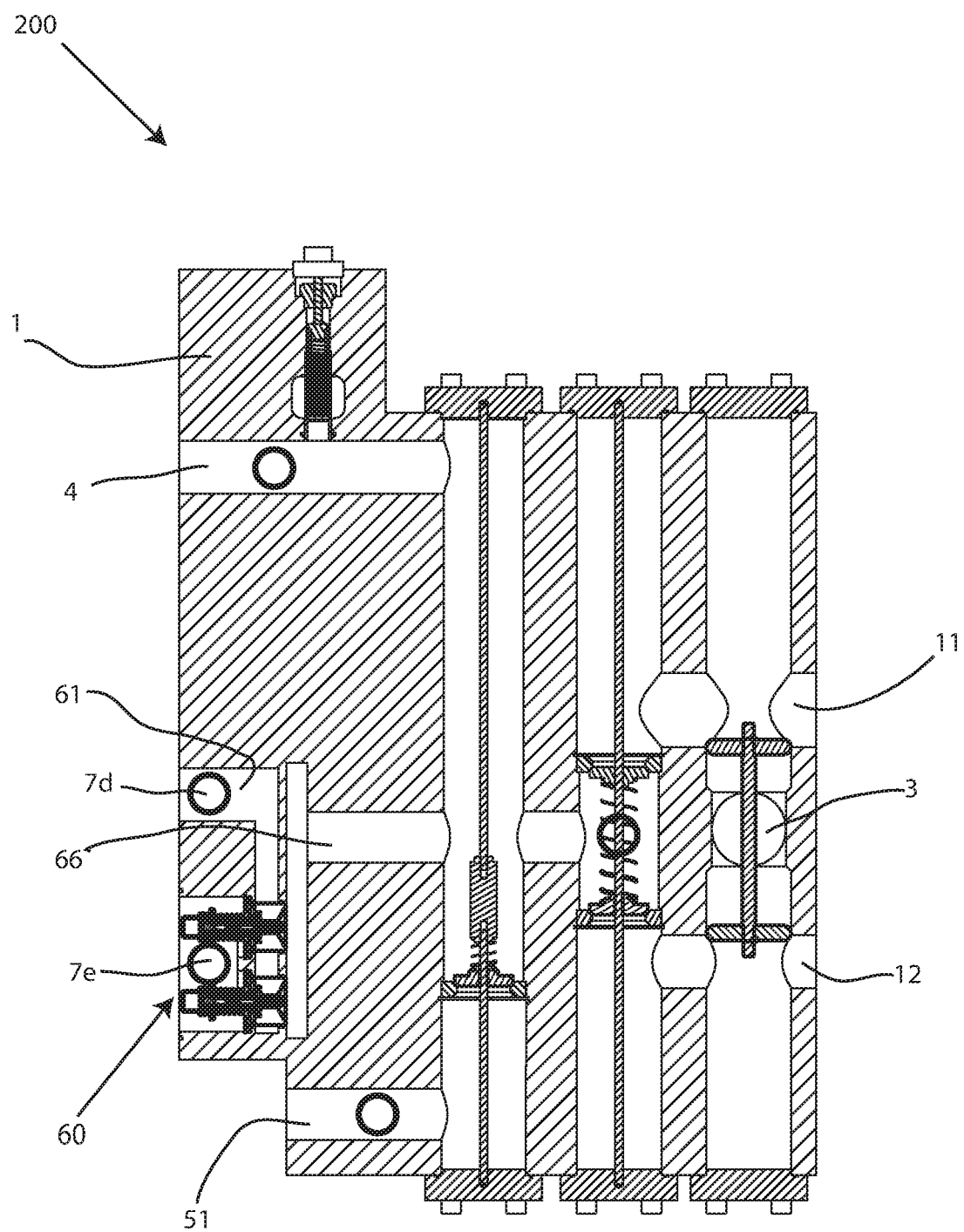
FIG. 5A depicts a cross-sectional view of the second embodiment of the integrated oil system manifold in a rest position.

With continued reference to the drawings, FIG. 4 depicts a schematic diagram of a second embodiment of the integrated oil system manifold 200. Embodiments of the integrated oil system manifold 200 may include the same or substantially the same structure, features, components, and functions of the oil system manifold 100. For example, embodiments of the integrated oil system manifold 200 may include a reverse rotation protection element 20, a main pump check valve 30, an auxiliary pump check valve 40, and a pressure relief valve 9. However, as shown in FIG. 5A, embodiments of the oil system manifold 200 may further include at least one thermostatic element 60. Embodiments of the thermostatic element 60 may be a thermostatic valve, a thermostatic temperature control valve, a temperature control valve, a temperature controller, a temperature regulator, a fluid temperature controller, a three-way mixing valve, and the like. Embodiments of the thermostatic element 60 may control a temperature of the oil discharged from the thermostatic element 60. Further, embodiments of the thermostatic element 60 may be integrated into the housing 1. For instance, at least one thermostatic element 60 may be disposed within the housing 1, wherein the housing 1 may be cast, machined or otherwise manufactured to create a space or opening for at least one thermostatic element 60 to be placed therein. In other words, the thermostatic element 60 may be considered part of the same housing 1 of the integrated oil system manifold 200. The thermostatic element(s) 60 may be a single device or multiple devices in parallel, depending on a flow rate of the oil within the housing 1.

Figure 5B:
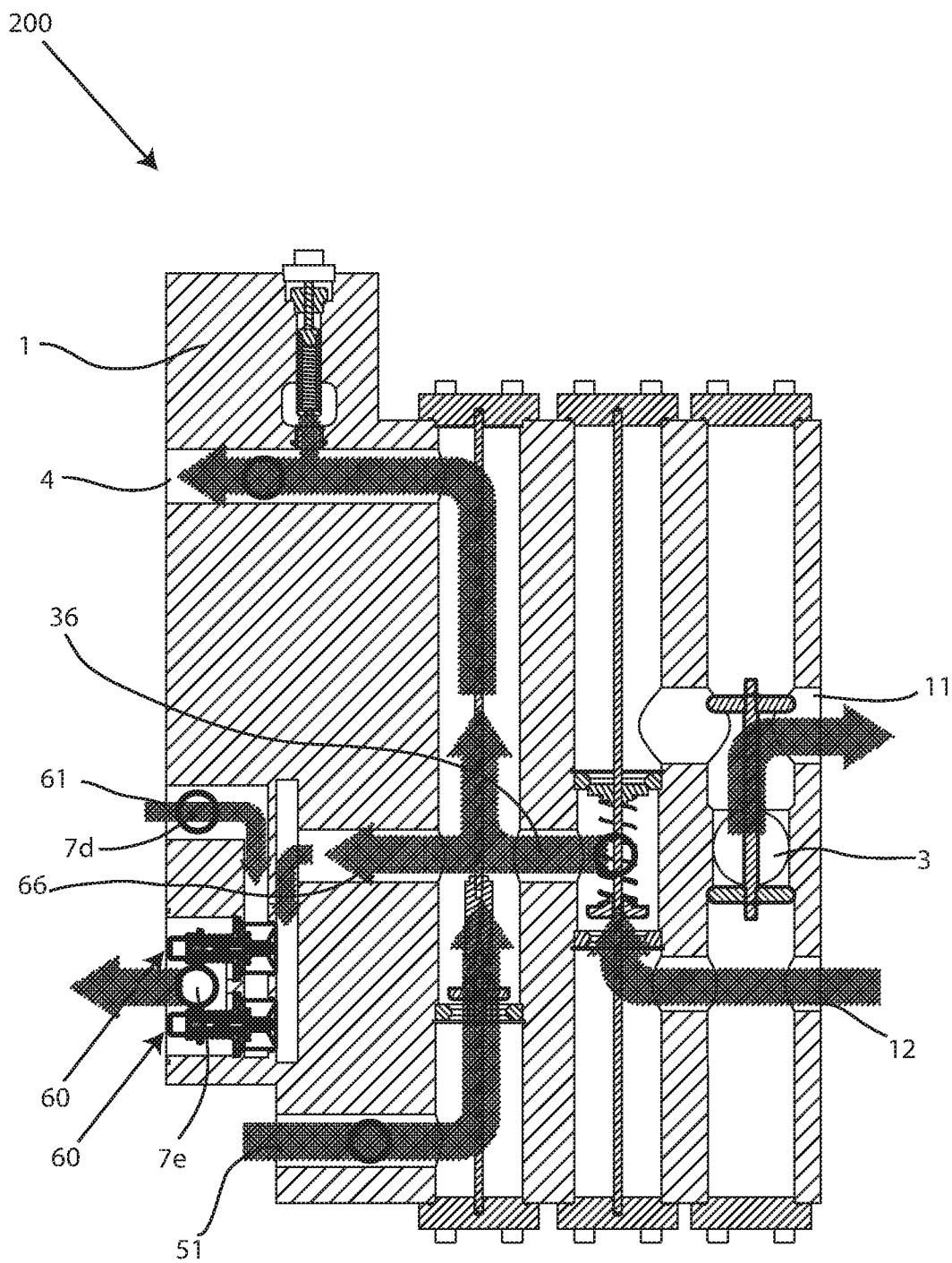
FIG. 5B depicts a cross-sectional view of the second embodiment of the integrated oil system manifold in a first operating position.
Figure 5C:
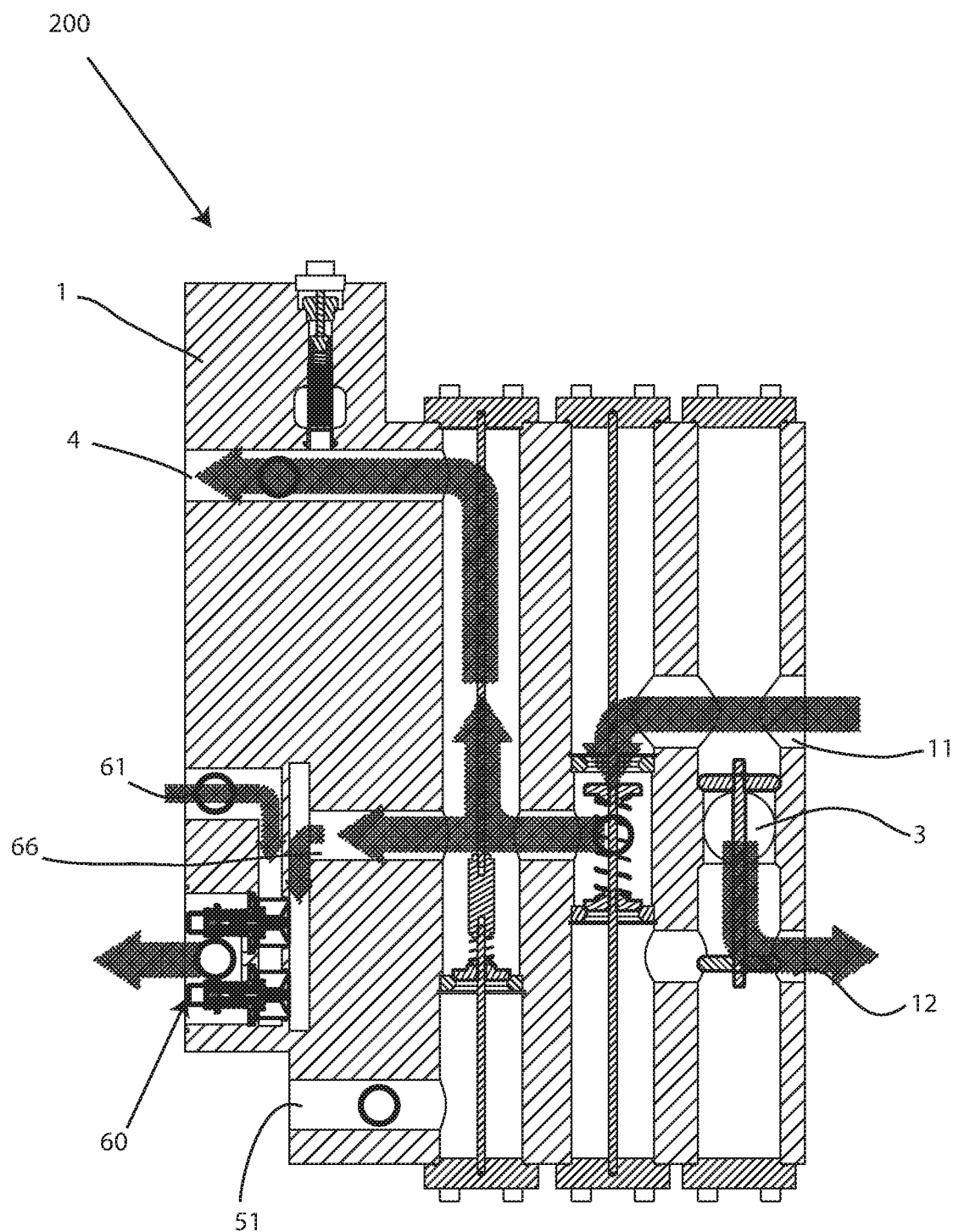
FIG. 5C depicts a cross-sectional view of the second embodiment of the integrated oil system manifold in a second operating position.

The manner in which the second embodiment of the integrated oil system manifold 200 can operate is shown in FIGS. 5A-5C. FIG. 5A depicts a second embodiment of the oil system manifold 200 in a rest position. FIG. 5B depicts a second embodiment of the oil system manifold 200 in a first operating position. FIG. 5C depicts a second embodiment of the oil system manifold 200 in a second operating position. The first operating position may be when the main pump 10 is operating in a normal direction, the auxiliary pump 50 is operating, the pressure relief valve 9 is open, and at least one thermostatic element 60 is open. The second operating position may be when the main pump 10 is operating in a reverse direction, the auxiliary pump 50 is not operating, the pressure relief valve 9 is closed, and the thermostatic element 60 may be open or closed dependent on a current fluid temperature (showed open in FIG. 5C).

As shown in FIG. 5B, the second embodiment of the manifold 200 is in the first operating position. The oil flows in a same or substantially similar manner as described with respect to the integrated oil system manifold 100 in the first operating position. In this second embodiment of the oil system manifold 200, a portion of the oil flowing through the third connection passage 36 may flow toward a passage 66 that may connect the third fluid pathway 45 and at least one thermostatic element 60, while the rest of the oil flows toward the discharge port 4. The hot oil that flows through passage 66 may interact with at least one thermostatic element 60. Further, oil leaving discharge port 4 may flow through a heat exchanger, and then this stream of cooled oil may be received by opening passage 61. Embodiments of the opening passage 61 may be an opening, a port, an inlet, an orifice, a gate, a bore, a passageway, a pathway, a hole, and the like. The opening passage 61 may be associated with a line or pipe that is feeding the housing 1 with an oil return feed, such as a cold oil return feed. The opening passage 61 may be located on an exterior surface of the housing 1 to create an inlet path for oil passing into the housing 1. One or more pressure, temperature or other instrument taps 7d may be disposed within the opening passage 61. Thus, the cold oil return may also interact with the thermostatic element 60. The thermostatic element 60 may discharge a stream of mixed oil as a result, and within this discharge one or more pressure, temperature or other instrument taps 7e may be disposed. The oil discharged from thermostatic element 60 may be delivered or otherwise provided to the machine 5 for lubrication.

FIG. 5C depicts the second embodiment of the manifold 200 in the second operating position. In this second operating position, the flow path of the oil and operation of the components are the same or substantially the same as described with respect to the first embodiment of manifold 100 in the second operating position. Dependent on current oil system temperature, at least one thermostatic element 60 may be open, discharging mixed hot and cold oil from thermostatic element 60, and there may also be hot oil discharging from port 4.

Figure 6:
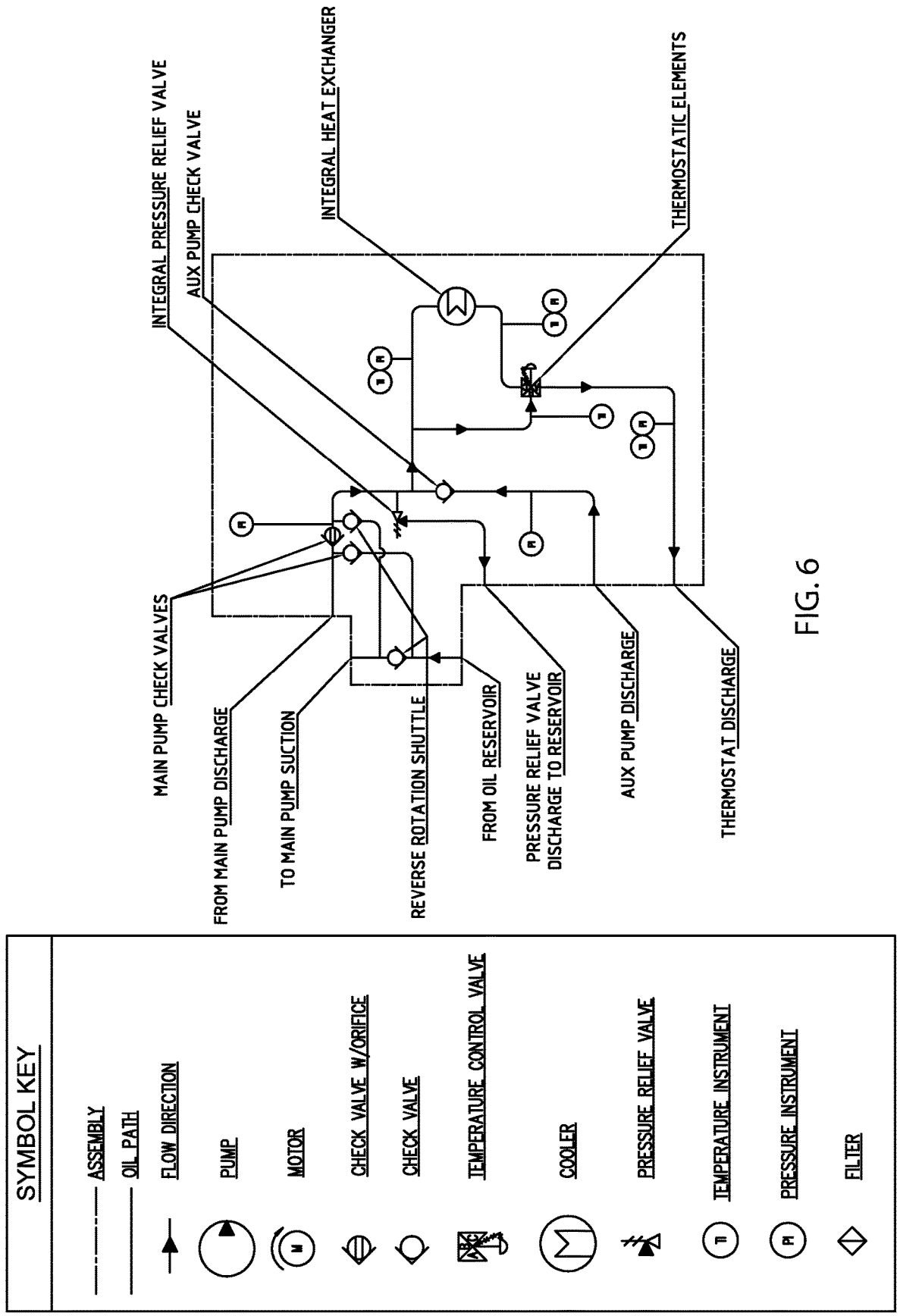
FIG. 6 depicts a schematic diagram of a third embodiment of the integrated oil system manifold.
Figure 7A:
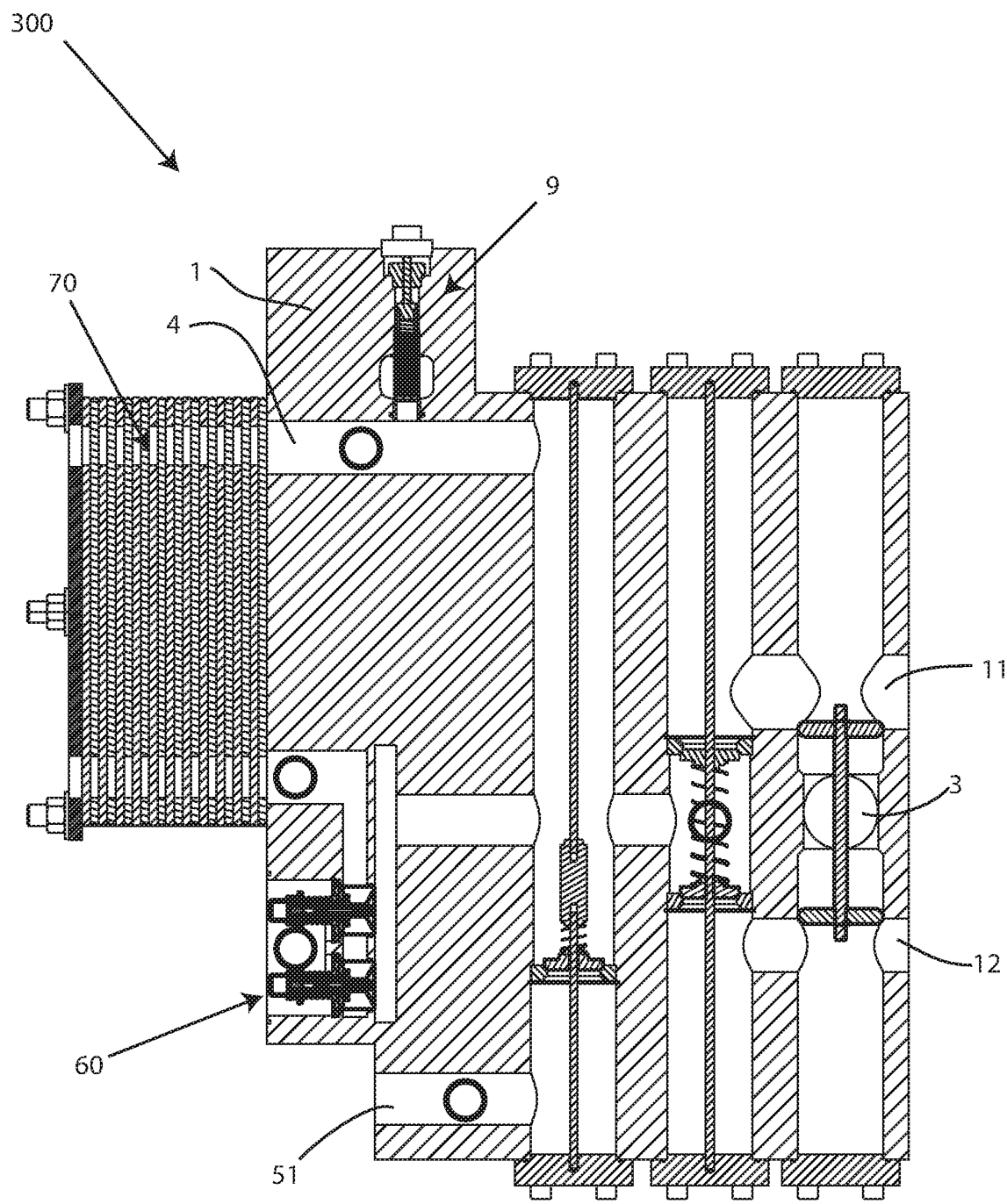
FIG. 7A depicts a cross-sectional view of the third embodiment of the integrated oil system manifold in a rest position.

Referring still to the drawings, FIG. 6 depicts a schematic diagram of a third embodiment of the integrated oil system manifold 300. Embodiments of the integrated oil system manifold 300 may include the same or substantially the same structure, features, components, and functions of the oil system manifold 100, 200. For example, embodiments of the integrated oil system manifold 300 may include a reverse rotation protection element 20, a main pump check valve 30, an auxiliary pump check valve 40, a pressure relief valve 9, and at least one thermostatic element 60. However, as shown in FIG. 7A, embodiments of the oil system manifold 300 may further include a heat exchanger 70. Embodiments of the heat exchanger 70 may be a plate style heat exchanger, a plate and frame heat exchanger, a brazed plate heat exchanger, a shell and tube heat exchanger, and the like, and may be operated in both series and parallel. Embodiments of the heat exchanger 70 may be integrated into the housing 1. For instance, the heat exchanger 70 may be operably coupled to the housing 1 and may receive oil from directly from discharge port 4 and provide it to opening passage 61, as opposed to using a heat exchanger which is remotely located and connected via one or more lines or pipes to the housing 1. In one embodiment, the heat exchanger 70 may be permanently fastened to the housing 1 via one or more fasteners. In other words, the heat exchanger 70 may be considered part of the same housing 1 of the integrated oil system manifold 300. In further embodiments, the heat exchanger 70 may be structurally integral with the housing 1. For example, the heat exchanger 70 may be cast together with the housing 1, or may be fabricated into the housing 1.

Figure 7B:
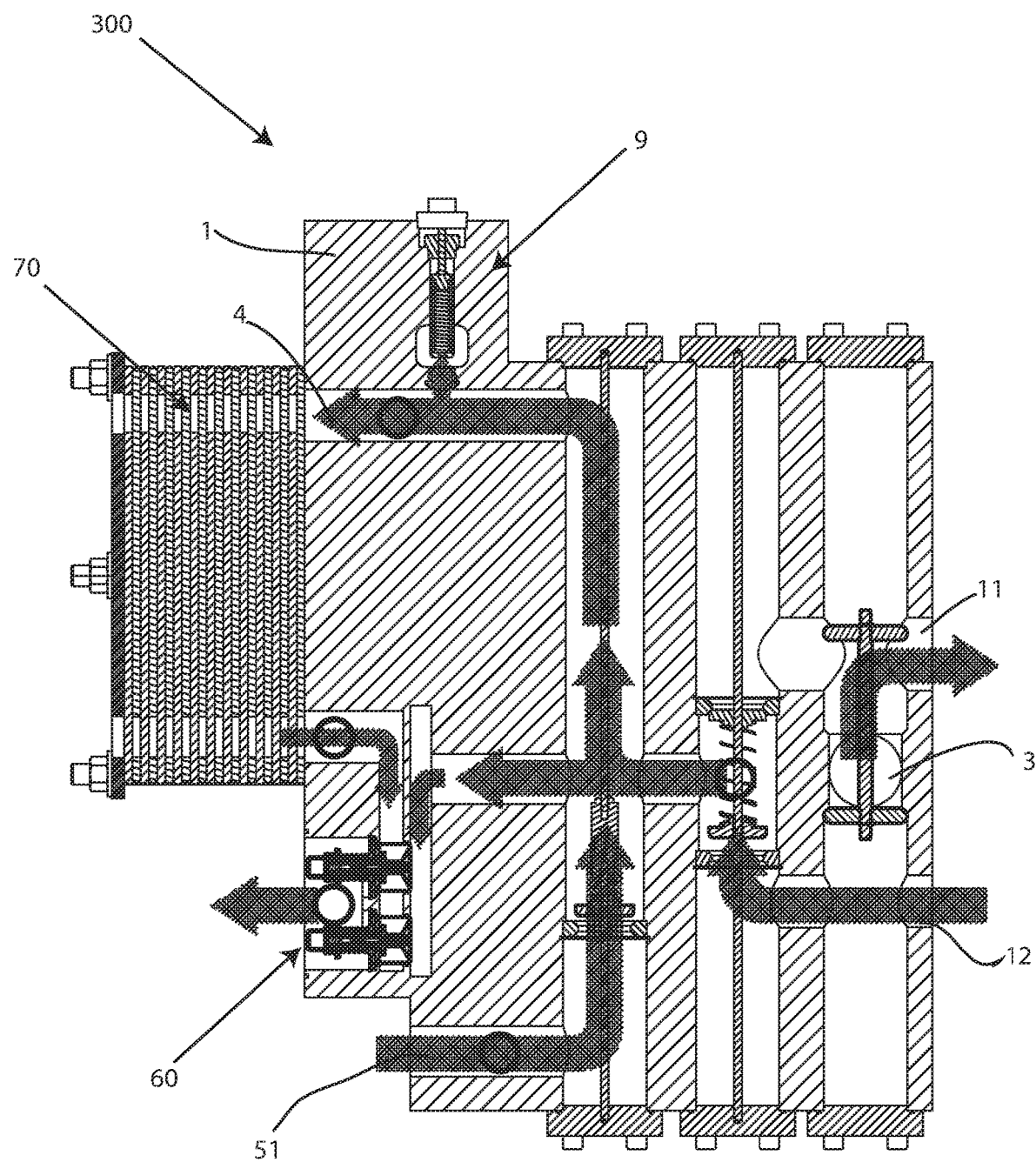
FIG. 7B depicts a cross-sectional view of the third embodiment of the integrated oil system manifold in a first operating position.
Figure 7C:
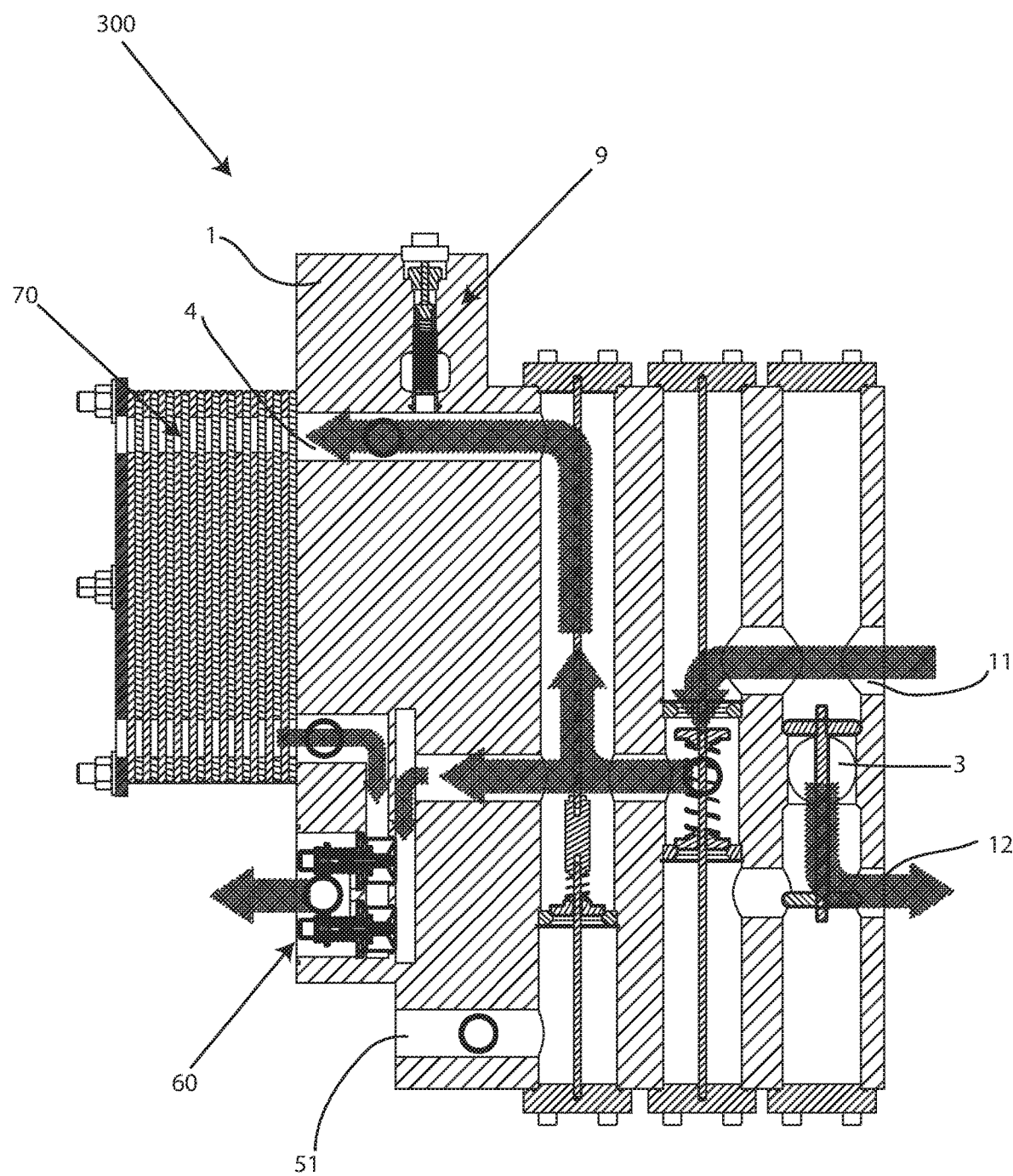
FIG. 7C depicts a cross-sectional view of the third embodiment of the integrated oil system manifold in a second operating position.

The manner in which the third embodiment of the integrated oil system manifold 300 can operate is shown in FIGS. 7A-7C. FIG. 7A depicts a third embodiment of the oil system manifold 300 in a rest position. FIG. 7B depicts a third embodiment of the oil system manifold 300 in a first operating position. FIG. 7C depicts a third embodiment of the oil system manifold 300 in a second operating position. The first operating position may be when the main pump 10 is operating in a normal direction, the auxiliary pump 50 is operating, the pressure relief valve 9 is open, and at least one thermostatic element 60 is open. The second operating position may be when the main pump 10 is operating in a reverse direction, the auxiliary pump 50 is not operating, the pressure relief valve 9 is closed, and the thermostatic element 60 may be open or closed dependent on a current fluid temperature (showed open in FIG. 7C).

As shown in FIG. 7B, the third embodiment of the manifold 300 is in the first operating position. The oil flows in a same or substantially similar manner as described with respect to the integrated oil system manifold 200 in the first operating position. Likewise, as shown in FIG. 7C, in the second operating position the oil flows in a same or substantially similar manner as described with respect to the integrated oil system manifold 200 in the second operating position.

Figure 8:
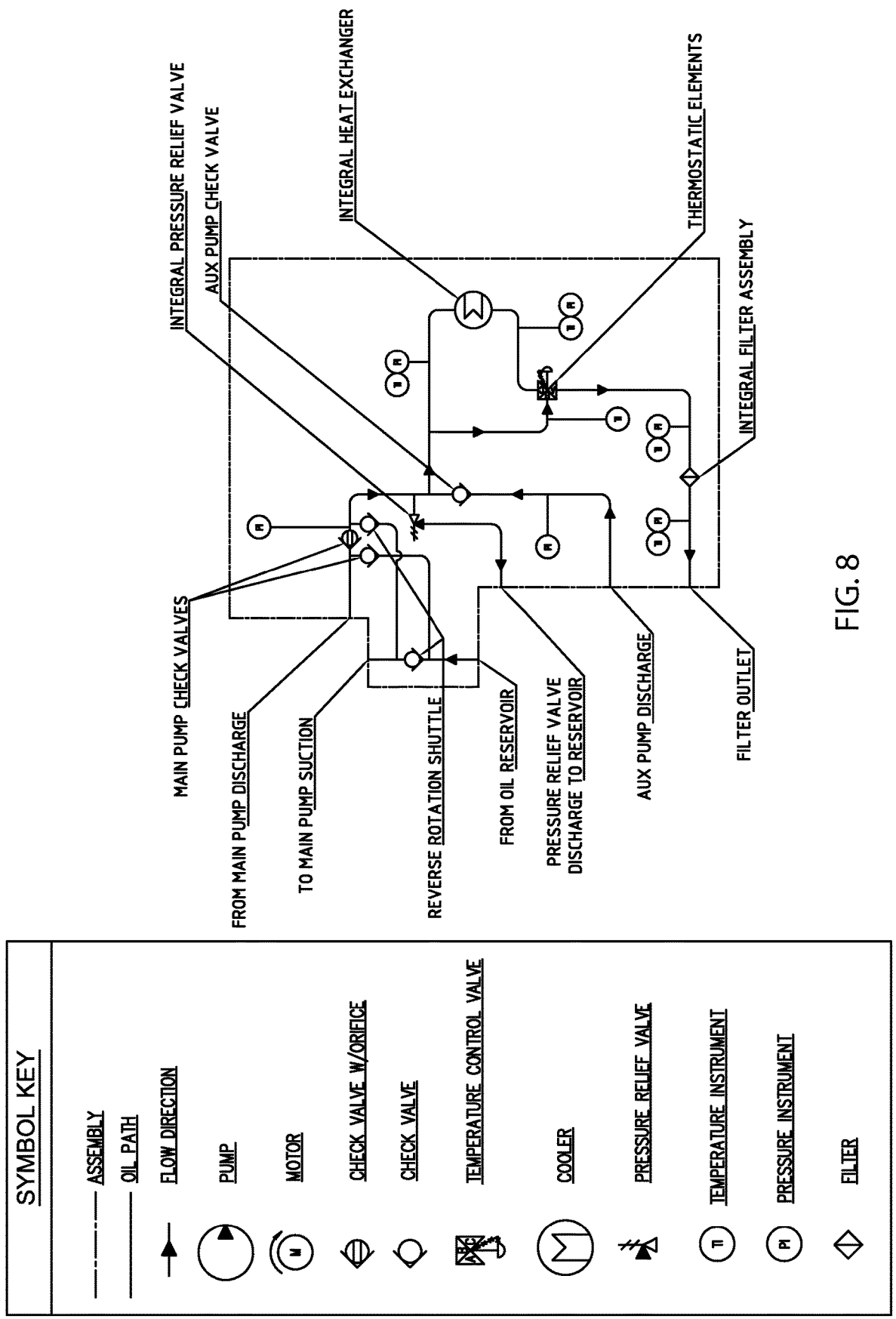
FIG. 8 depicts a schematic diagram of a fourth embodiment of the integrated oil system manifold.
Figure 9A:
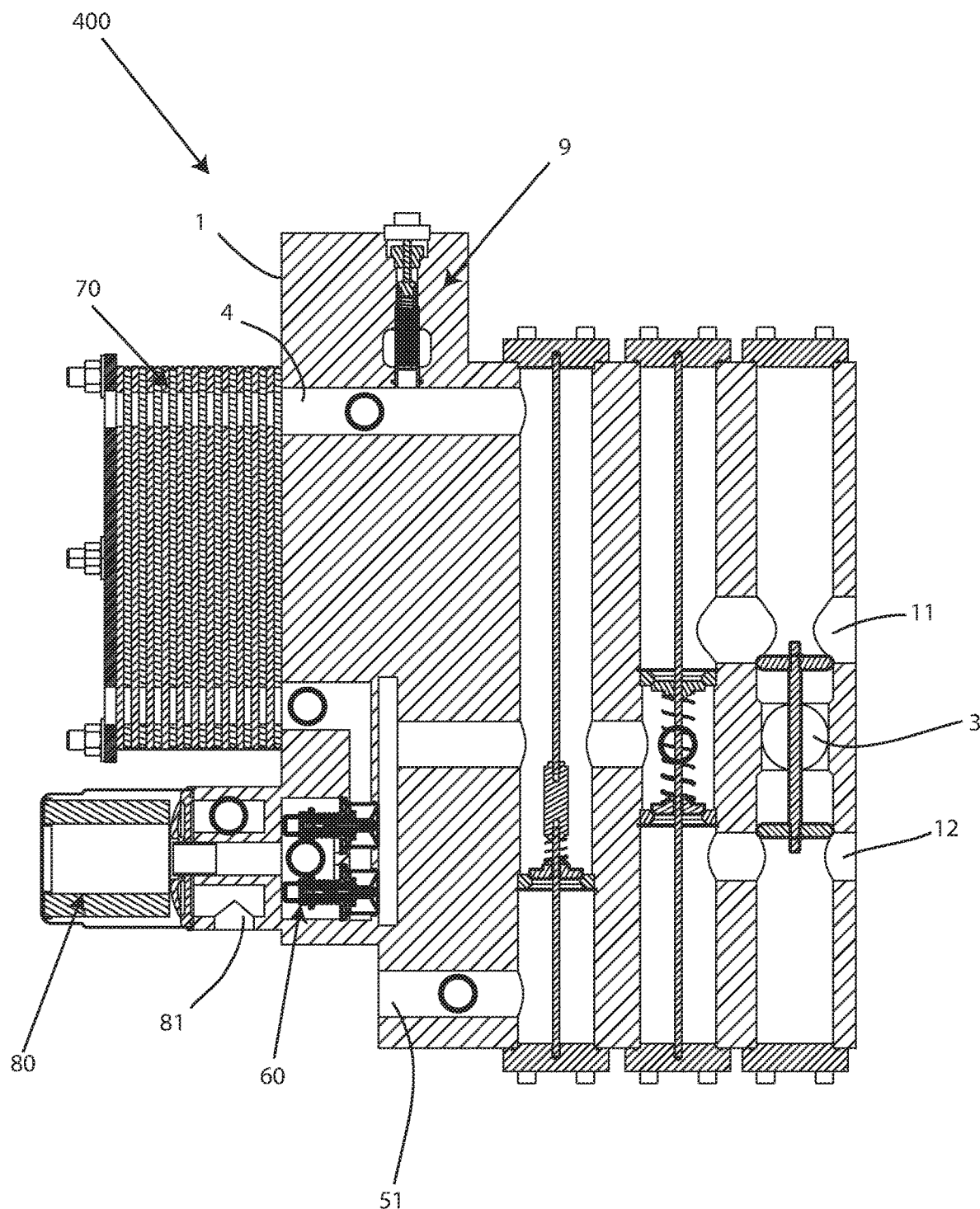
FIG. 9A depicts a cross-sectional view of the fourth embodiment of the integrated oil system manifold in a rest position.

With continued reference to the drawings, FIG. 8 depicts a schematic diagram of a fourth embodiment of the integrated oil system manifold 400. Embodiments of the integrated oil system manifold 400 may include the same or substantially the same structure, features, components, and functions of the oil system manifold 100, 200, 300. For example, embodiments of the integrated oil system manifold 400 may include a reverse rotation protection element 20, a main pump check valve 30, an auxiliary pump check valve 40, a pressure relief valve 9, at least one thermostatic element 60, and a heat exchanger 70. However, as shown in FIG. 9A, embodiments of the oil system manifold 400 may further include a filter assembly 80. Embodiments of the filter assembly 80 may include an oil filter, a filter, an oil filtration body, and the like. The oil filter may be of the spin on, canister or other type and may be single, dual or multi element. Filter assembly 80 may also include a transfer valve or valves, drain valves, etc. Embodiments of the filter assembly 80 may receive, treat, and/or filter a discharge stream exiting at least one thermostatic element 60. Further, embodiments of the filter assembly 80 may be integrated into the housing 1. For instance, at least part of the filter assembly 80 may be manufactured as part of the housing 1 or operably coupled to the housing 1. In an exemplary embodiment, a head of the filter assembly 80 may be integrated with or manufactured as part of the housing 1. In one embodiment, the filter assembly 80 may be permanently fastened to the housing 1 via one or more fasteners. In other words, the filter assembly 80 may be considered part of the same housing 1 of the integrated oil system manifold 400.

Figure 9B:
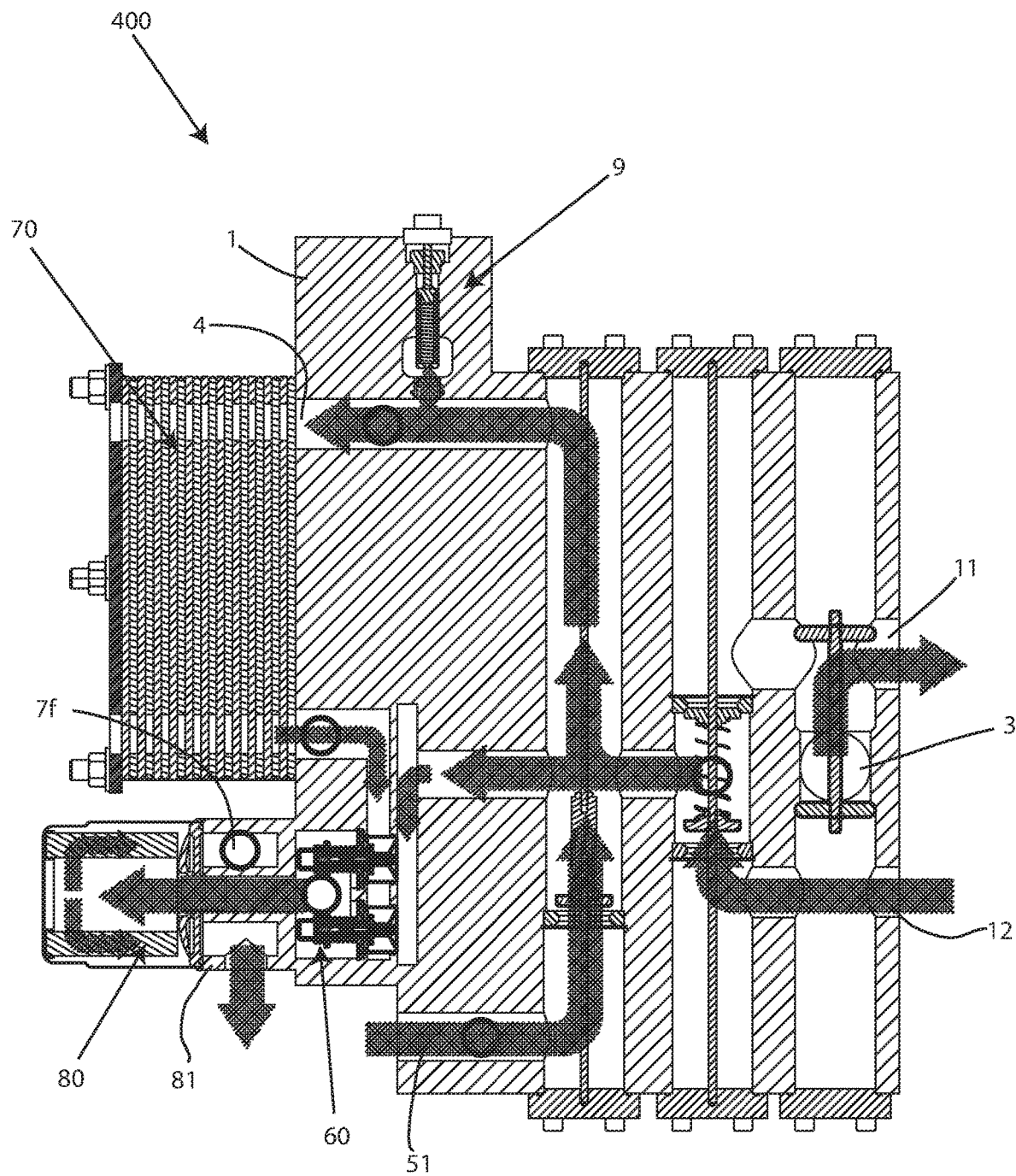
FIG. 9B depicts a cross-sectional view of the fourth embodiment of the integrated oil system manifold in a first operating position.
Figure 9C:
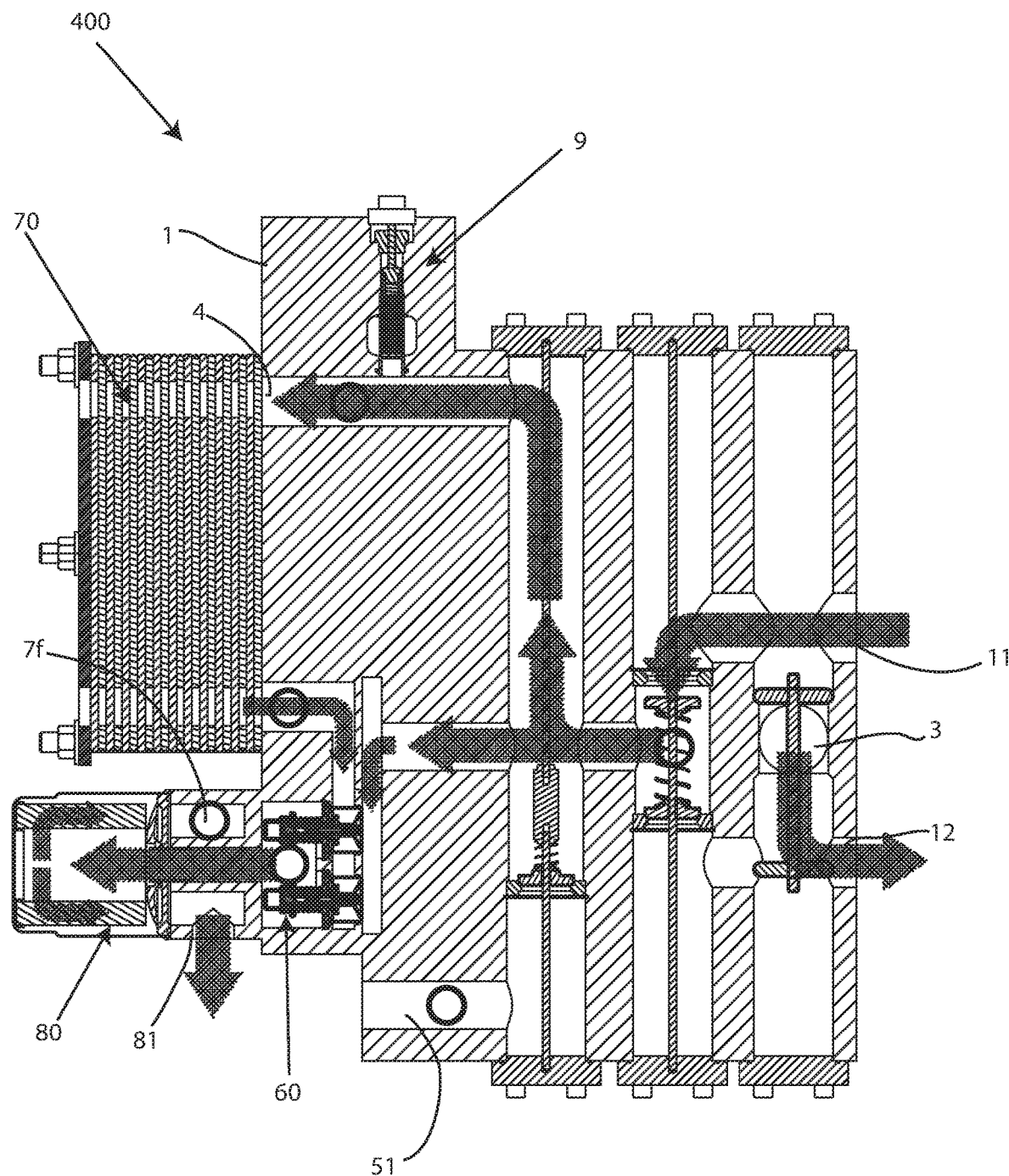
FIG. 9C depicts a cross-sectional view of the fourth embodiment of the integrated oil system manifold in a second operating position.

The manner in which the fourth embodiment of the integrated oil system manifold 400 can operate is shown in FIGS. 9A-9C. FIG. 9A depicts a fourth embodiment of the oil system manifold 400 in a rest position. FIG. 9B depicts a fourth embodiment of the oil system manifold 400 in a first operating position. FIG. 9C depicts a fourth embodiment of the oil system manifold 400 in a second operating position. The first operating position may be when the main pump 10 is operating in a normal direction, the auxiliary pump 50 is operating, the pressure relief valve 9 is open, and at least one thermostatic element 60 is open. The second operating position may be when the main pump 10 is operating in a reverse direction, the auxiliary pump 50 is not operating, the pressure relief valve 9 is closed, and the thermostatic element 60 may be open or closed dependent on a current fluid temperature (showed open in FIG. 9C).

As shown in FIG. 9B, the fourth embodiment of the manifold 400 is in the first operating position. The oil flows in a same or substantially similar manner as described with respect to the integrated oil system manifold 300 in the first operating position. Likewise, as shown in FIG. 9C, in the second operating position the oil flows in a same or substantially similar manner as described with respect to the integrated oil system manifold 300 in the second operating position. The oil discharged from filter assembly 80 through passage 81 may be delivered or otherwise provided to the machine 5 for lubrication. One or more pressure, temperature or other instrument taps 7f may be disposed within passage 81.

Figure 10:
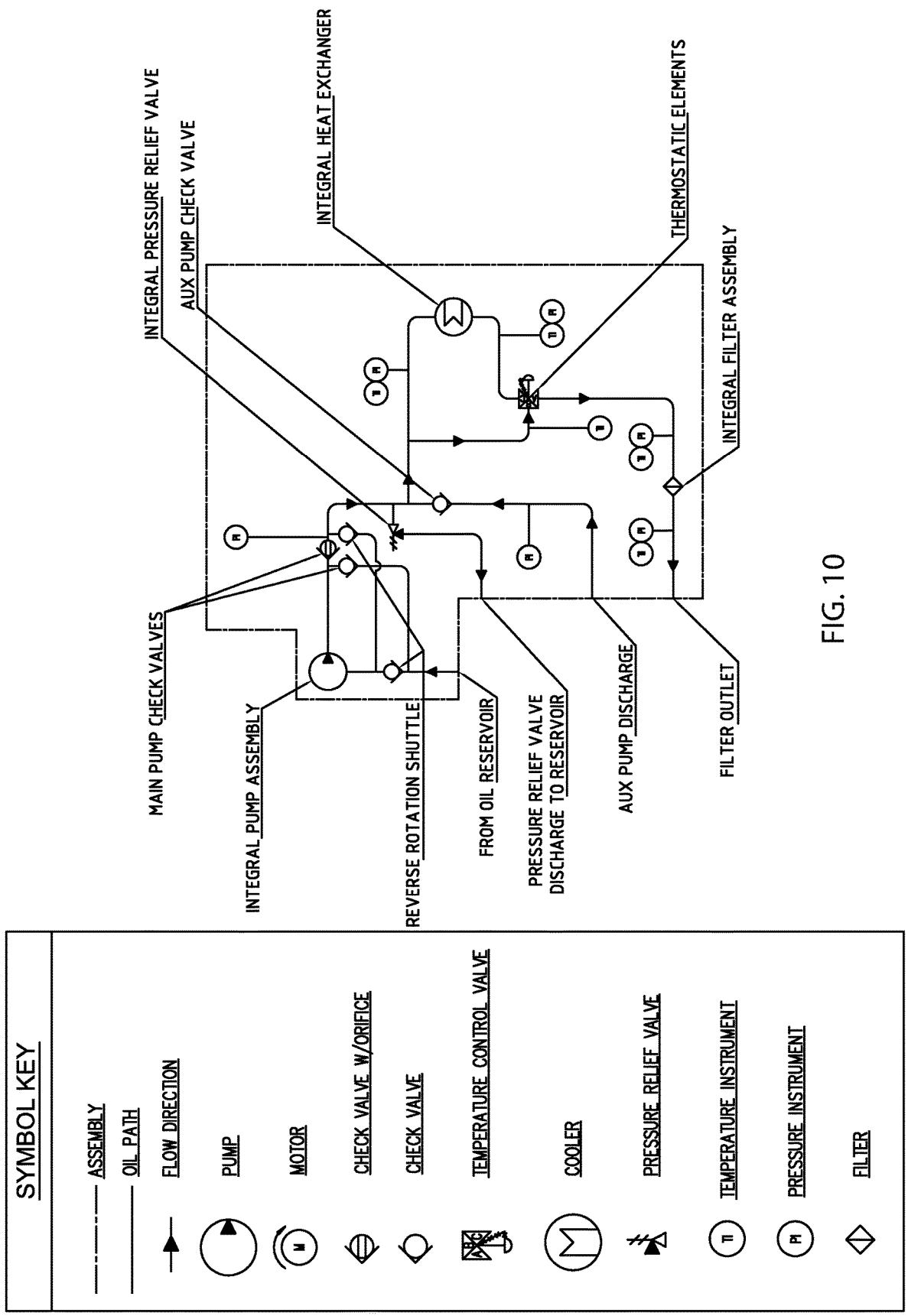
FIG. 10 depicts a schematic diagram of a fifth embodiment of the integrated oil system manifold.
Figure 11A:
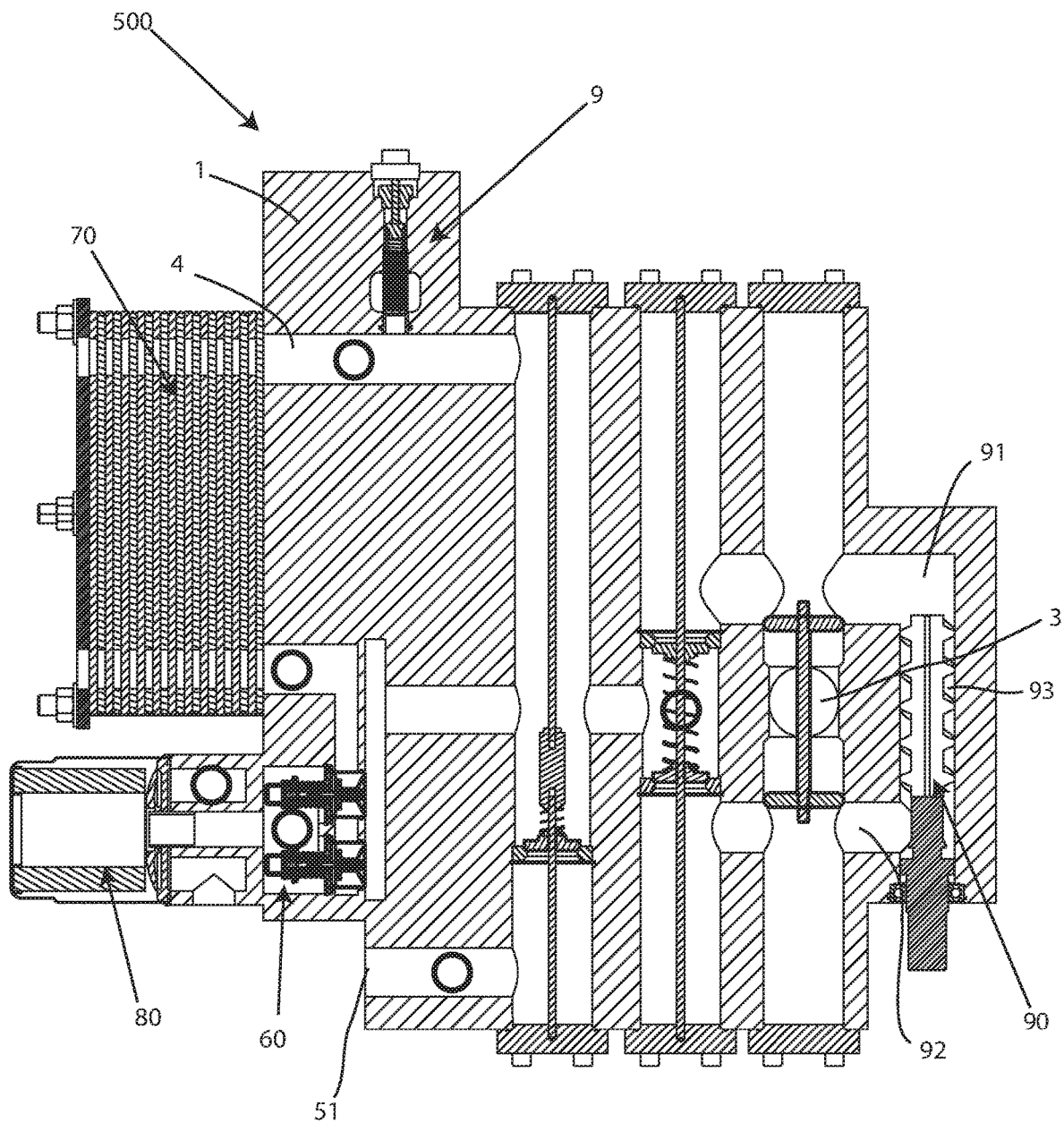
FIG. 11A depicts a cross-sectional view of the fifth embodiment of the integrated oil system manifold in a rest position.

FIG. 10 depicts a schematic diagram of a fifth embodiment of the integrated oil system manifold 500. Embodiments of the integrated oil system manifold 500 may include the same or substantially the same structure, features, components, and functions of the oil system manifold 100, 200, 300, 400. For example, embodiments of the integrated oil system manifold 500 may include a reverse rotation protection element 20, a main pump check valve 30, an auxiliary pump check valve 40, a pressure relief valve 9, at least one thermostatic element 60, a heat exchanger 70, and a filter assembly 80. However, as shown in FIG. 11A, embodiments of the oil system manifold 500 may further include an integral main pump assembly 90. Embodiments of the integral main pump assembly may be a pump, a progressive cavity pump, a screw pump, a gear pump, a positive displacement pump, a gerotor, and the like. Embodiments of the integral main pump assembly 90 may draw oil from the oil reservoir 2 and into the housing 1, as opposed to using a main pump, such as main pump 10, which is remotely located and connected via one or more lines or pipes to the housing 1. Further, embodiments of the integral main pump assembly 90 may be integrated into the housing 1. For instance, the integral main pump assembly 90 may be disposed within the housing 1, wherein the housing 1 may be machined or otherwise designed or manufactured to create a space or opening for the integral main pump assembly 90 to be positioned therein. In other words, the integral main pump assembly 90 may be considered part of the same housing 1 of the integrated oil system manifold 500. The integral main pump assembly 90 may be operably coupled to the machine 5 and may be the main pump for the system. For example, the integral main pump assembly 90 may be rotatably coupled to the machine 5.

Figure 11B:
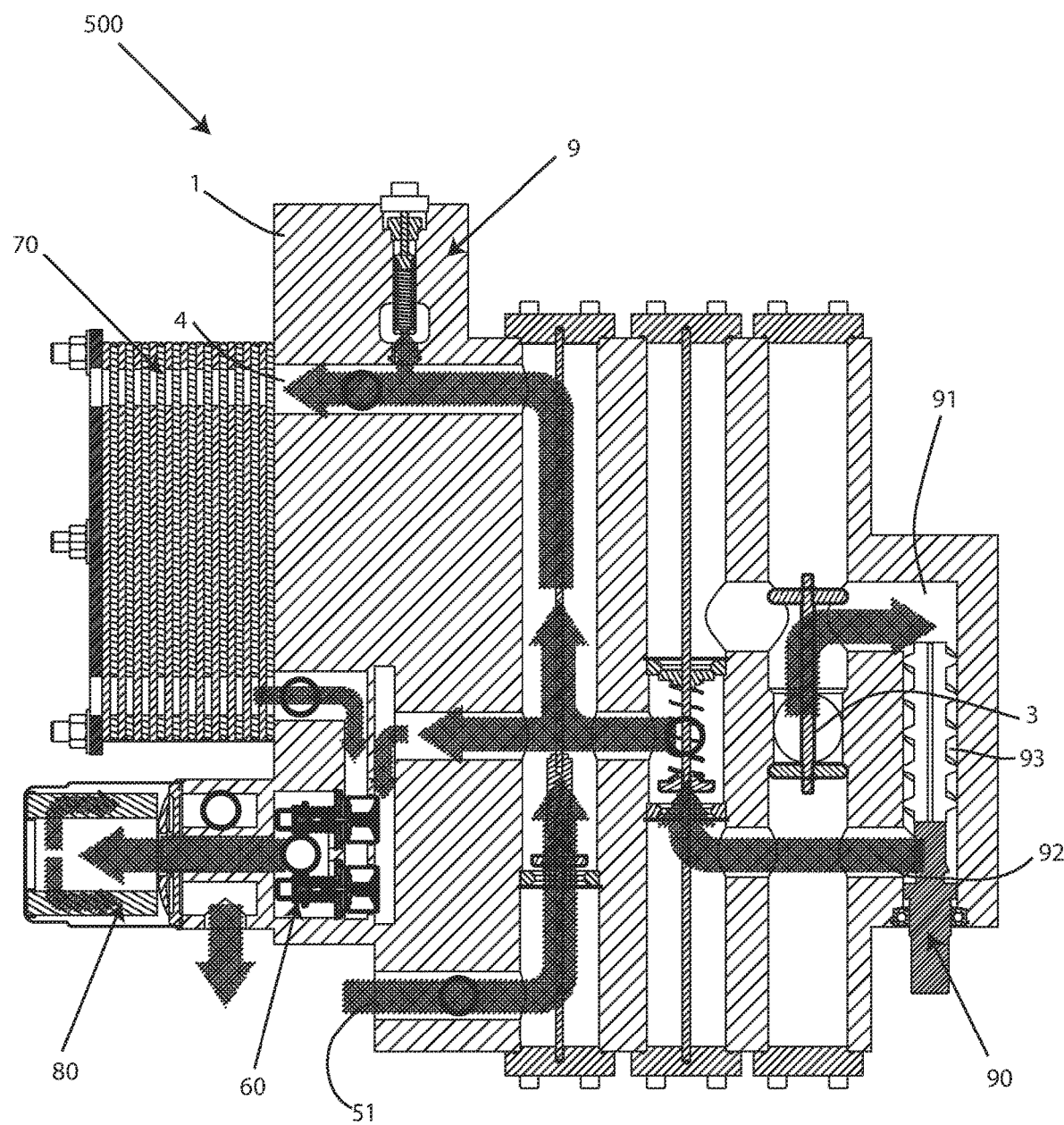
FIG. 11B depicts a cross-sectional view of the fifth embodiment of the integrated oil system manifold in a first operating position.
Figure 11C:
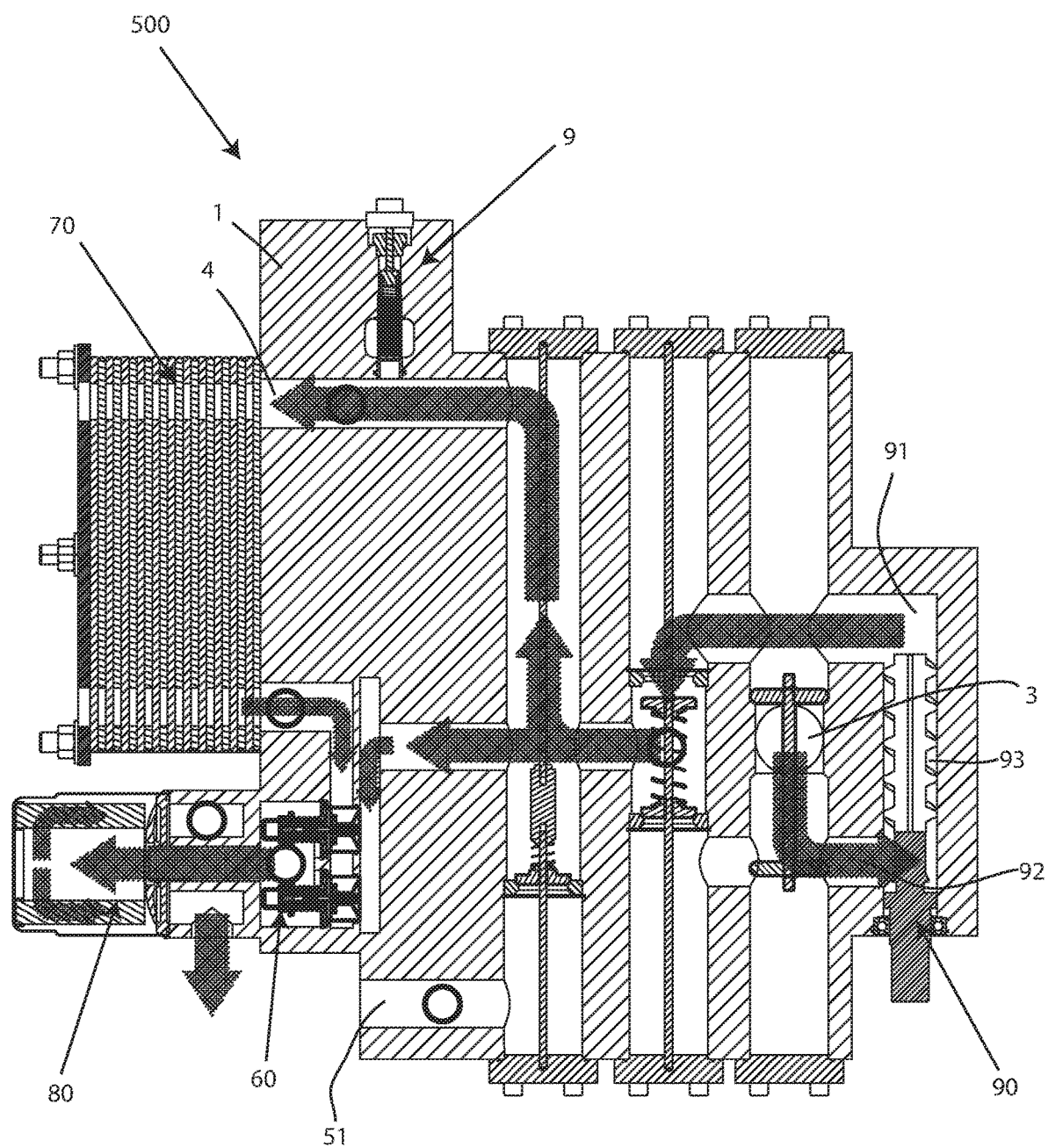
FIG. 11C depicts a cross-sectional view of the fifth embodiment of the integrated oil system manifold in a second operating position.

The manner in which the fifth embodiment of the integrated oil system manifold 500 can operate is shown in FIGS. 11A-11C. FIG. 11A depicts a fifth embodiment of the oil system manifold 500 in a rest position. Embodiments of the manifold 500 may include an inlet connection passage 91 and discharge connection passage 92. Embodiments of the connection passages 91 and 92 may be a pathway, a passage, a channel, a bore, a passageway, and the like. Disposed between connection passages 91 and 92 may be a pump channel 93. Embodiments of the pump channel 93 may be a pathway, a passage, a channel, a bore, a passageway, and the like. Pump channel 93 may receive oil drawn from the oil reservoir 2 through operation of the integral main pump assembly 90. The pump 90 may reside within the pump channel 93, wherein a diameter or cross-sectional areas of the pump channel 93 may correspond to a diameter or cross-section of the integral main pump assembly 90 (e.g. correspond to a size of screw pump). The inlet connection passage 91 and the discharge connection passage 92 may provide access to the first fluid pathway 25 or second fluid pathway 35 of the housing from the pump channel 93.

FIG. 11B depicts a fifth embodiment of the oil system manifold 500 in a first operating position. FIG. 11C depicts a fifth embodiment of the oil system manifold 500 in a second operating position. The first operating position may be when the integral main pump assembly 90 is operating in a normal direction, the auxiliary pump 50 is operating, the pressure relief valve 9 is open, and at least one thermostatic element 60 is open. The second operating position may be when the integral main pump assembly 90 is operating in a reverse direction, the auxiliary pump 50 is not operating, the pressure relief valve 9 is closed, and the thermostatic element 60 may be open or closed dependent on a current fluid temperature (showed open in FIG. 11C).

As shown in FIG. 11B, the fifth embodiment of the manifold 500 is in the first operating position. As the integral main pump assembly 90 is actuated, oil is drawn via suction force from an oil reservoir, such as reservoir 2, and through oil reservoir port 3 into the housing 1 and then into the inlet connection passage 91. The reverse rotation protection element 20 may be displaced such that the second valve disc 22 makes contact with the second valve seat 24, while the first valve disk 21 is positioned to allow the free flow of oil from oil reservoir port 3 to the inlet connection passage 91. The oil is forced through integral main pump assembly 90 and through the discharge connection passage 92, into the first fluid pathway 25 or second fluid pathway 35 and then to second connection passage 27. Oil is prevented from flowing from discharge connection passage 92 back to oil reservoir port 3 by the second valve disc 22 that is engaged with the second valve seat 24. From there, the oil flows in a same or substantially similar manner as described with respect to the integrated oil system manifold 400 in the first operating position. As shown in FIG. 11C, the oil flows in a same or substantially similar manner as described with respect to the integrated oil system manifold 400 in the second operating position, wherein oil flows from oil reservoir port 3 through discharge connection passage 92, pump channel 93, and back through the inlet connection passage 91 into the first fluid pathway 25 or second fluid pathway 35 and then to first connection passage 26.

Figure 12:
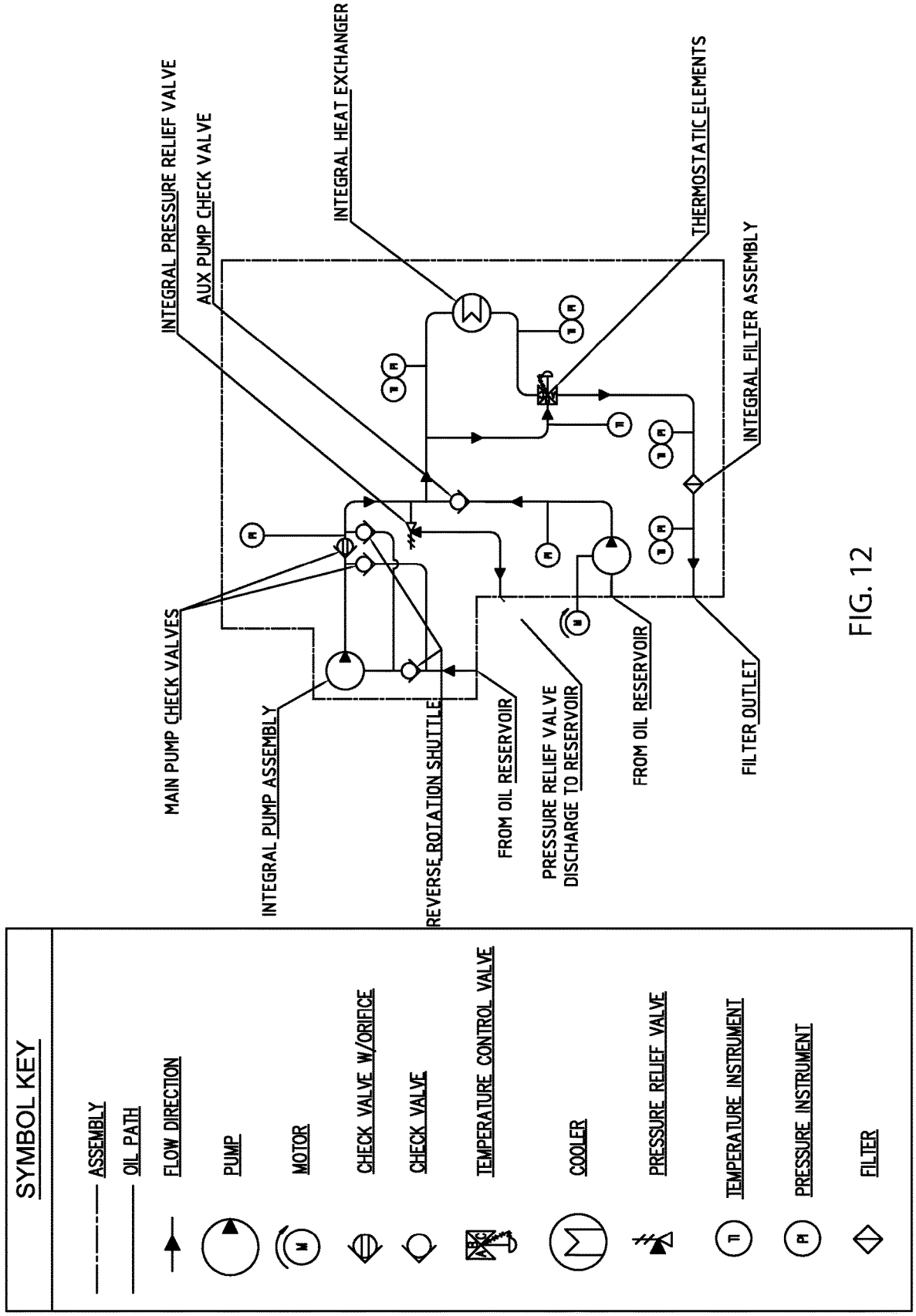
FIG. 12 depicts a schematic diagram of a sixth embodiment of the integrated oil system manifold.
Figure 13A:
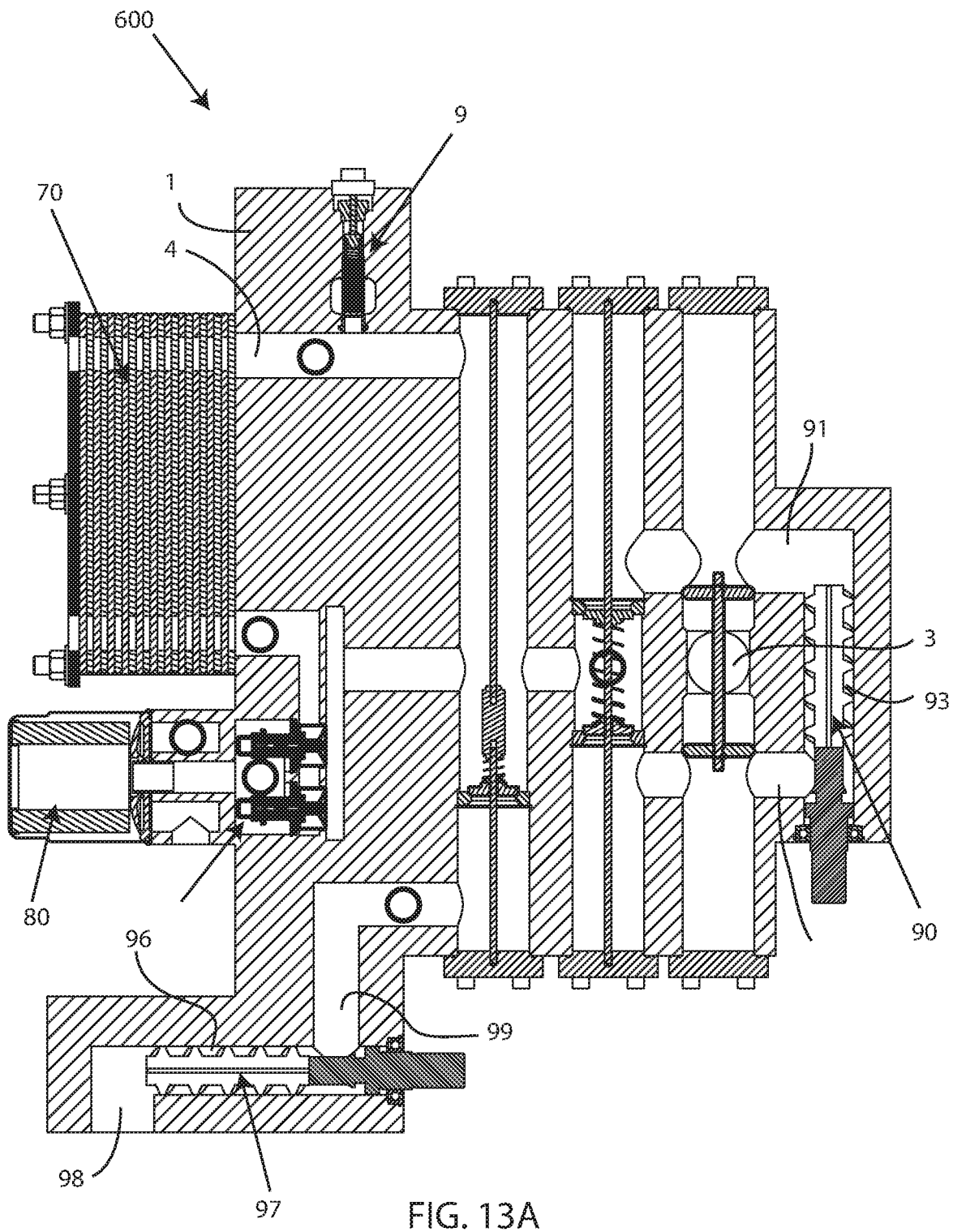
FIG. 13A depicts a cross-sectional view of the sixth embodiment of the integrated oil system manifold in a rest position.

A sixth embodiment of the integrated oil system manifold 600 is shown in FIG. 12. Embodiments of the integrated oil system manifold 600 may include the same or substantially the same structure, features, components, and functions of the oil system manifold 100, 200, 300, 400, 500. For example, embodiments of the integrated oil system manifold 600 may include a reverse rotation protection element 20, a main pump check valve 30, an auxiliary pump check valve 40, a pressure relief valve 9, at least one thermostatic element 60, a heat exchanger 70, a filter assembly 80, and an integral main pump assembly 90. However, as shown in FIG. 13A, embodiments of the oil system manifold 600 may further include an integral auxiliary pump assembly 97. Embodiments of the integral auxiliary pump assembly 97 may be a pump, a progressive cavity pump, a screw pump, a gear pump, a positive displacement pump, a gerotor, and the like. Embodiments of the integral main pump assembly 97 may draw oil from the oil reservoir 2 through pipe 52a into the housing 1, as opposed to using a separate auxiliary pump, such as auxiliary pump 50, which is remotely located and connected via one or more lines or pipes to the housing 1. Further, embodiments of the integral auxiliary pump assembly 97 may be integrated into the housing 1. For instance, the integral main pump assembly 97 may be disposed within the housing 1, wherein the housing 1 may be machined or otherwise designed or manufactured to create a space or opening for the integral auxiliary pump assembly 97 to be positioned therein. In other words, the integral auxiliary pump assembly 97 may be considered part of the same housing 1 of the integrated oil system manifold 600.

Figure 13B:
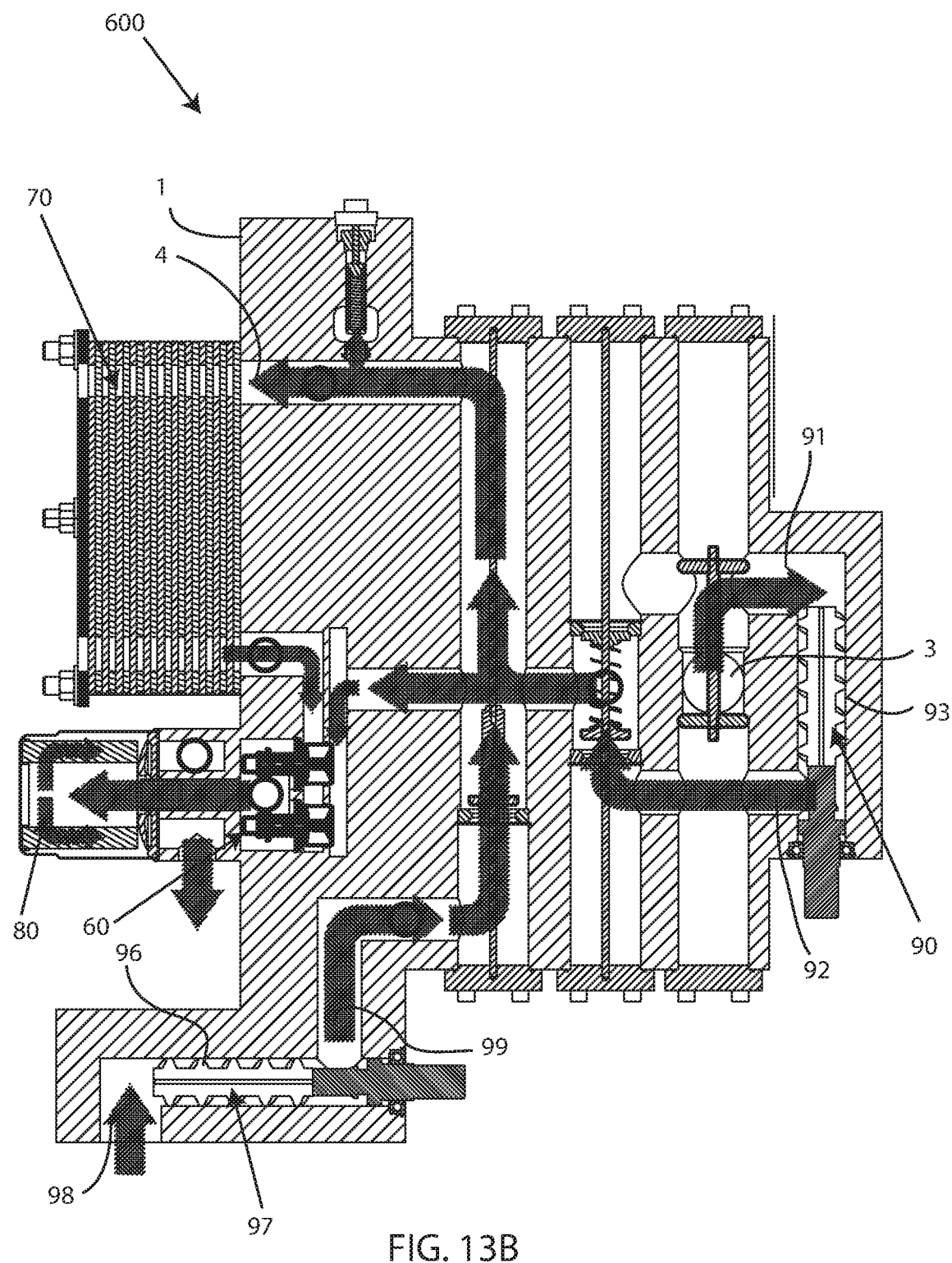
FIG. 13B depicts a cross-sectional view of the sixth embodiment of the integrated oil system manifold in a first operating position.
Figure 13C:
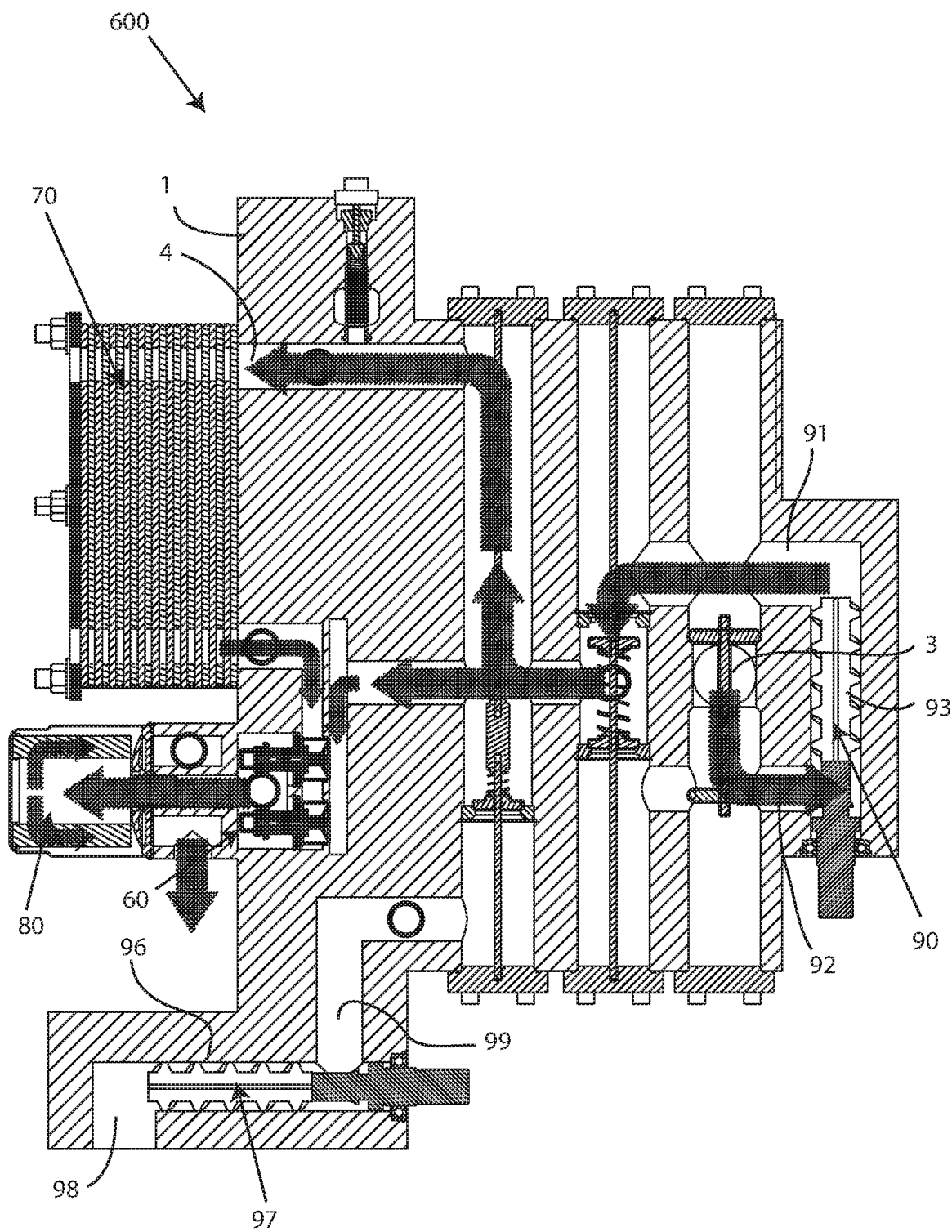
FIG. 13C depicts a cross-sectional view of the sixth embodiment of the integrated oil system manifold in a second operating position.

The manner in which the sixth embodiment of the integrated oil system manifold 600 can operate is shown in FIGS. 13A-13C. FIG. 13A depicts a sixth embodiment of the oil system manifold 600 in a rest position. Embodiments of the manifold 600 may include an inlet connection passage 98 and discharge connection passage 99. Discharge connection passage 99 connects to or replaces auxiliary pump port 51. Embodiments of the connection passages 98 and 99 may be a pathway, a passage, a channel, a bore, a passageway, and the like. Disposed between connection passages 98 and 99 may be a pump channel 96. Embodiments of the pump channel 96 may be a pathway, a passage, a channel, a bore, a passageway, and the like. Pump channel 96 may receive oil drawn from the oil reservoir 2 through operation of the integral auxiliary pump assembly 97. The pump 97 may reside within the pump channel 96, wherein a diameter or cross-sectional areas of the pump channel 96 may correspond to a diameter or cross-section of the integral auxiliary assembly 97 (e.g. correspond to a size of screw pump). The discharge connection passage 99 may provide access to the third fluid pathway 45 of the housing from the pump channel 96.

FIG. 13B depicts a sixth embodiment of the oil system manifold 600 in a first operating position. FIG. 13C depicts a sixth embodiment of the oil system manifold 600 in a second operating position. The first operating position may be when the integral main pump assembly 90 is operating in a normal direction, the integral auxiliary pump 97 is operating, the pressure relief valve 9 is open, and at least one thermostatic element 60 is open. The second operating position may be when the integral main pump assembly 90 is operating in a reverse direction, the integral auxiliary pump 97 is not operating, the pressure relief valve 9 is closed, and the thermostatic element 60 may be open or closed dependent on a current fluid temperature (showed open in FIG. 13C).

As shown in FIG. 13B, the sixth embodiment of the manifold 600 is in the first operating position. As the integral main pump assembly 90 is actuated, oil is drawn via suction from an oil reservoir, such as reservoir 2, and through oil reservoir port 3 into the housing 1 and then into the inlet connection passage 91. The reverse rotation protection element 20 may be displaced such that the second valve disc 22 makes contact with the second valve seat 24, while the first valve disc 21 is positioned to allow the free flow of oil from oil reservoir port 3 to the inlet connection passage 91. The oil is forced through integral main pump assembly 90 and through the discharge connection passage 92, into the first fluid pathway 25. Oil is prevented from flowing from discharge connection passage 92 back to oil reservoir port 3 by the second valve disc 22 that is engaged with the second valve seat 24. From there, the oil flows in a same or substantially similar manner as described with respect to the integrated oil system manifold 500 in the first operating position. As shown in FIG. 13C, the oil flows in a same or substantially similar manner as described with respect to the integrated oil system manifold 500 in the second operating position, wherein oil flows from oil reservoir port 3 through discharge connection passage 92, pump channel 93, and back through the inlet connection passage 91

Figure 14:
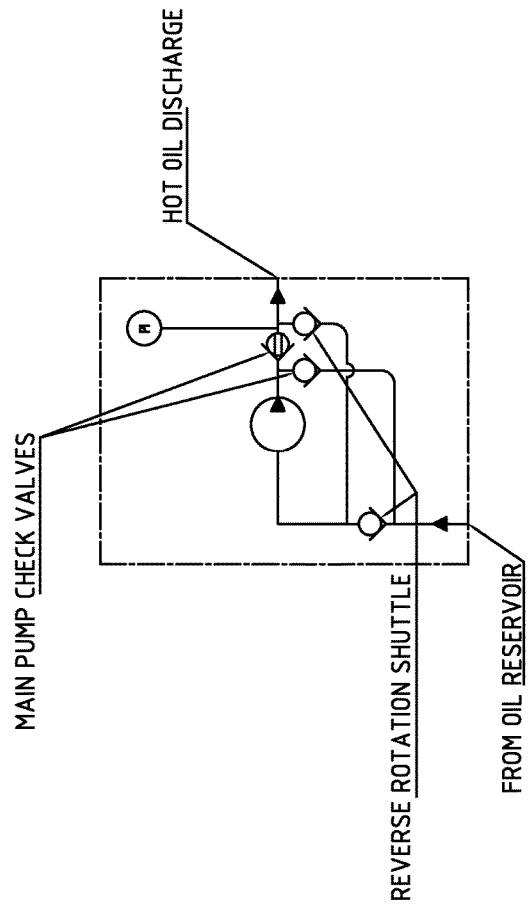
FIG. 14 depicts a schematic diagram of a seventh embodiment of the integrated oil system manifold.
Figure 14:
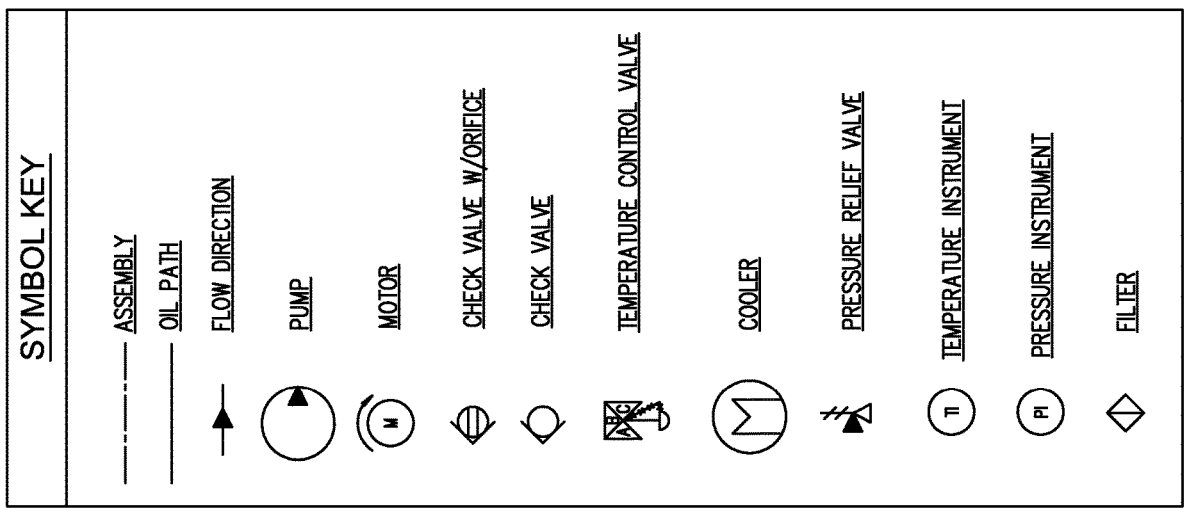
Figure 15A:
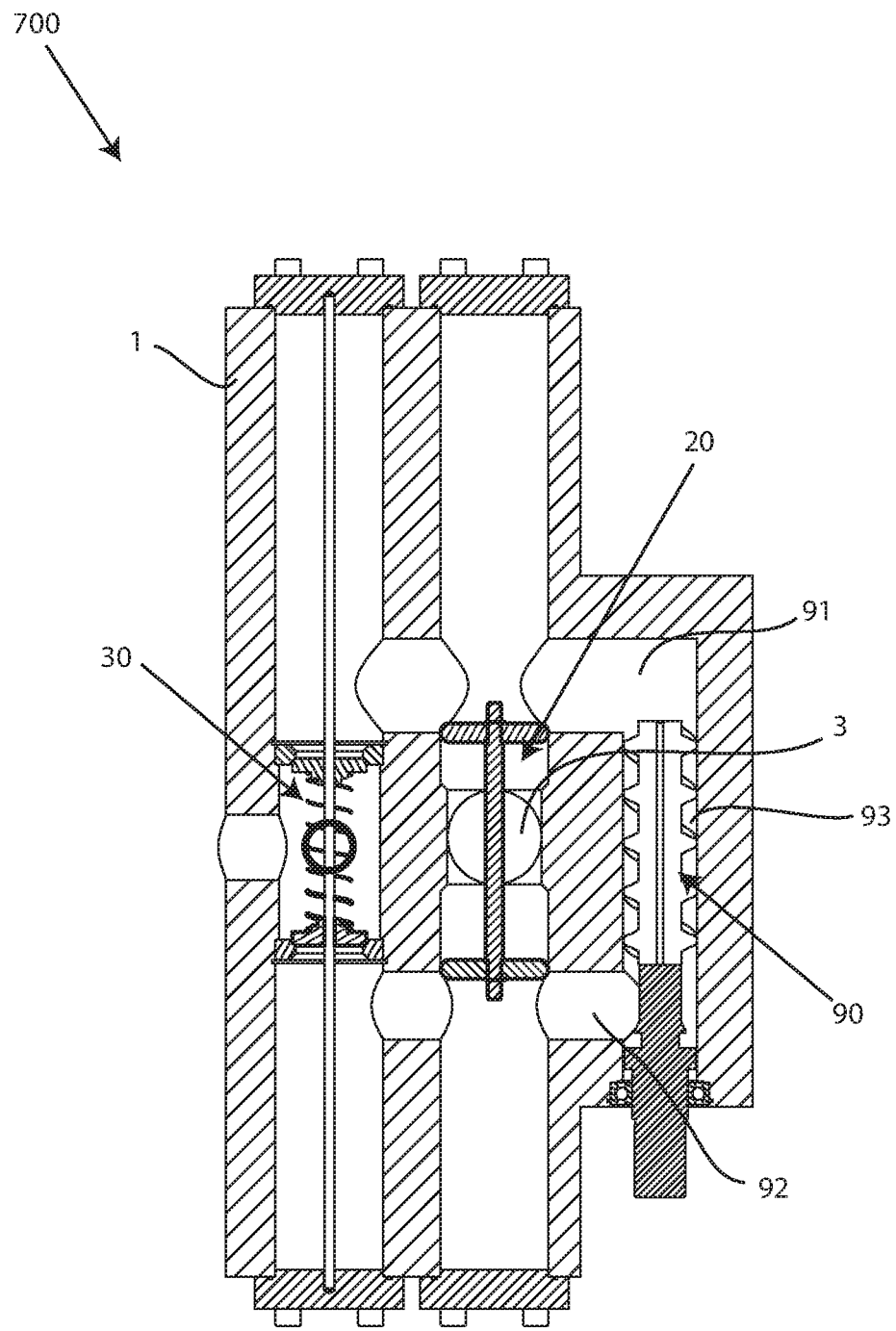
FIG. 15A depicts a cross-sectional view of the seventh embodiment of the integrated oil system manifold in a rest position.
Figure 15B:
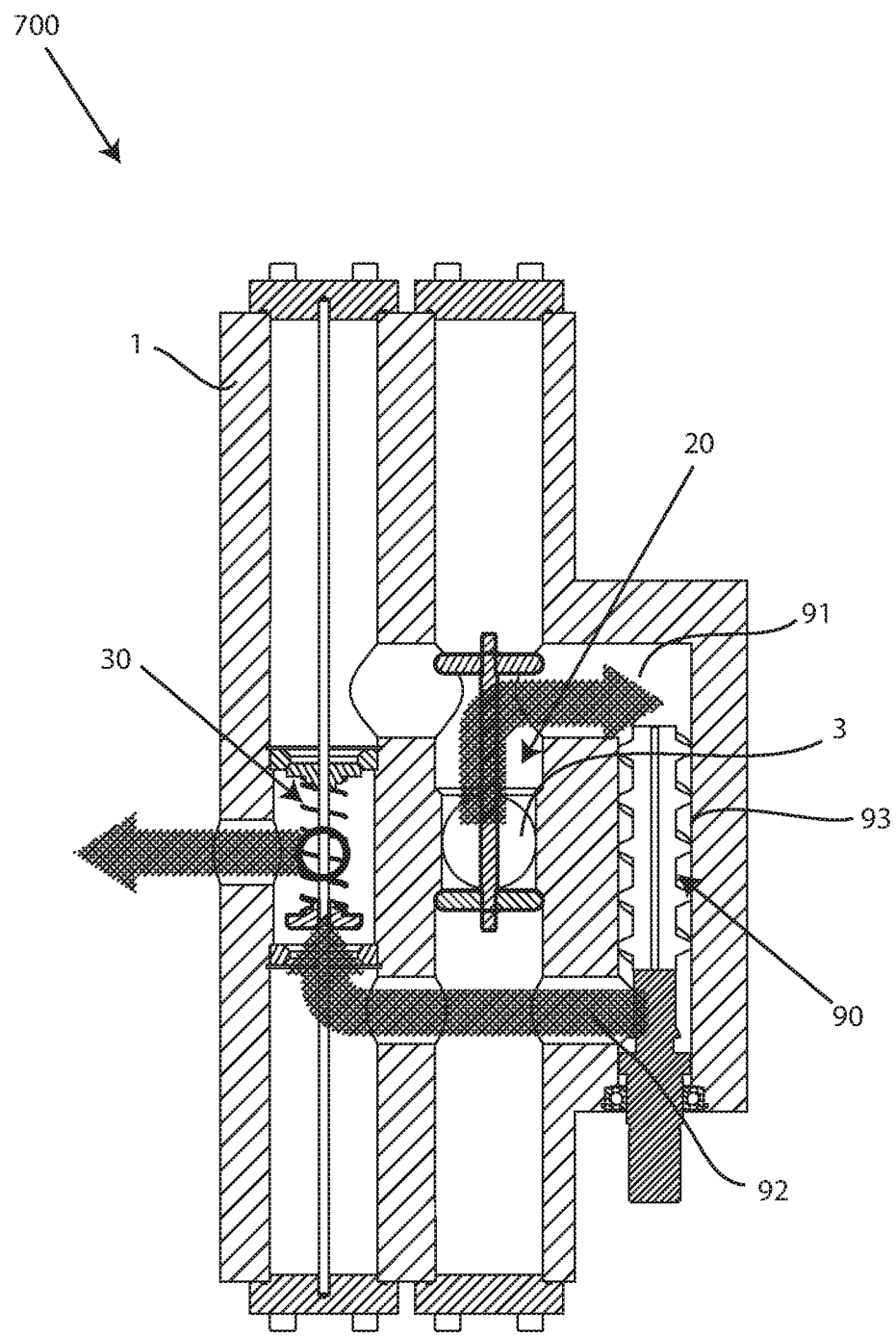
FIG. 15B depicts a cross-sectional view of the seventh embodiment of the integrated oil system manifold in a first operating position.
Figure 15C:
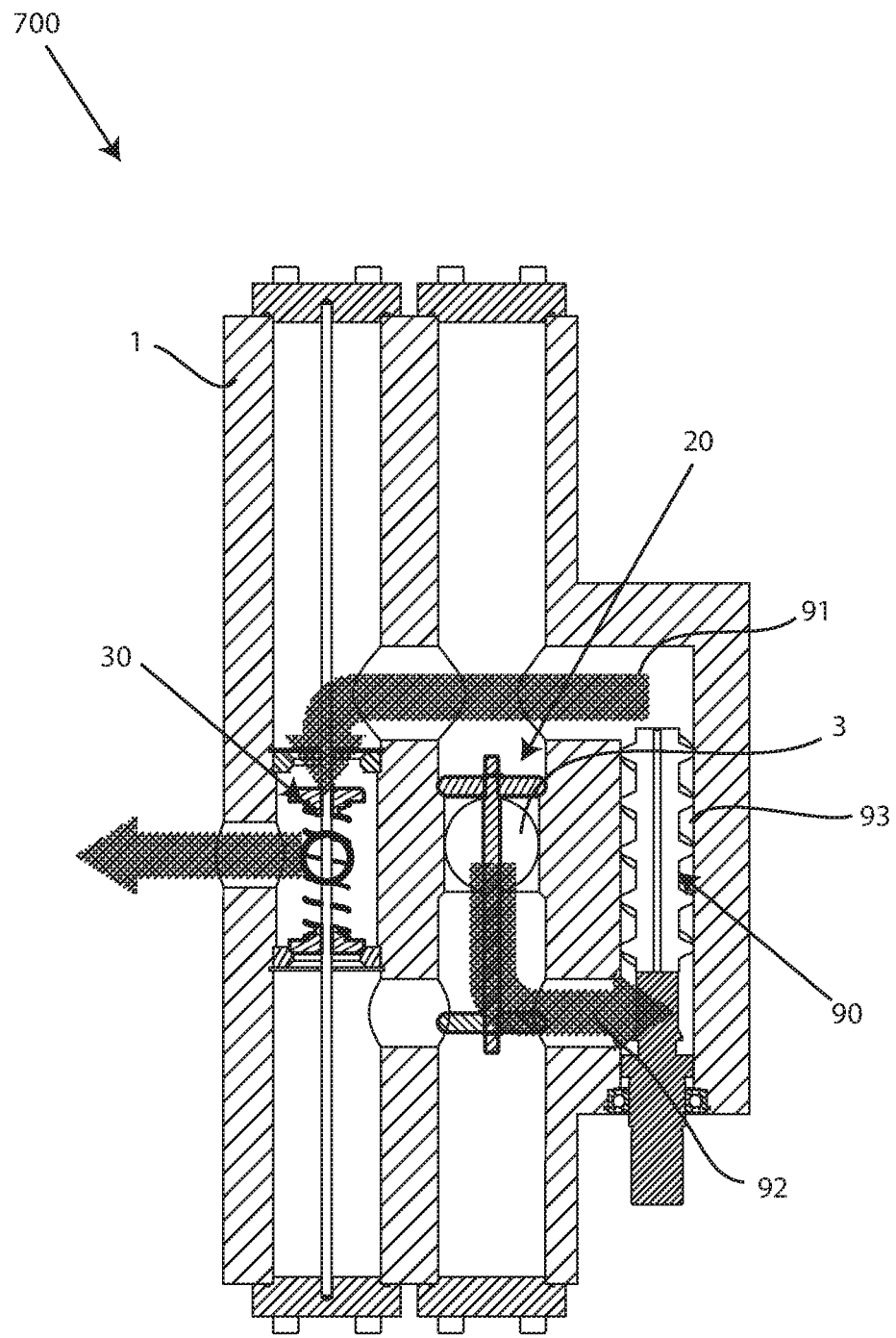
FIG. 15C depicts a cross-sectional view of the seventh embodiment of the integrated oil system manifold in a second operating position.

A seventh embodiment of the integrated oil system manifold 700 is shown in FIG. 14. Embodiments of the integrated oil system manifold 700 may include a reverse rotation protection element 20, a main pump check valve 30, and an integral main pump assembly 90, wherein the reverse rotation protection element 20, the main pump check valve 30, and the integral main pump assembly 90 are integrated with a housing 1 of the integrated oil system manifold 700. The manner in which the seventh embodiment of the integrated oil system manifold 700 can operate is shown in FIGS. 15A-15C, which may be similar to the manner described with references to FIGS. 13A-13C.

Figure 16A:
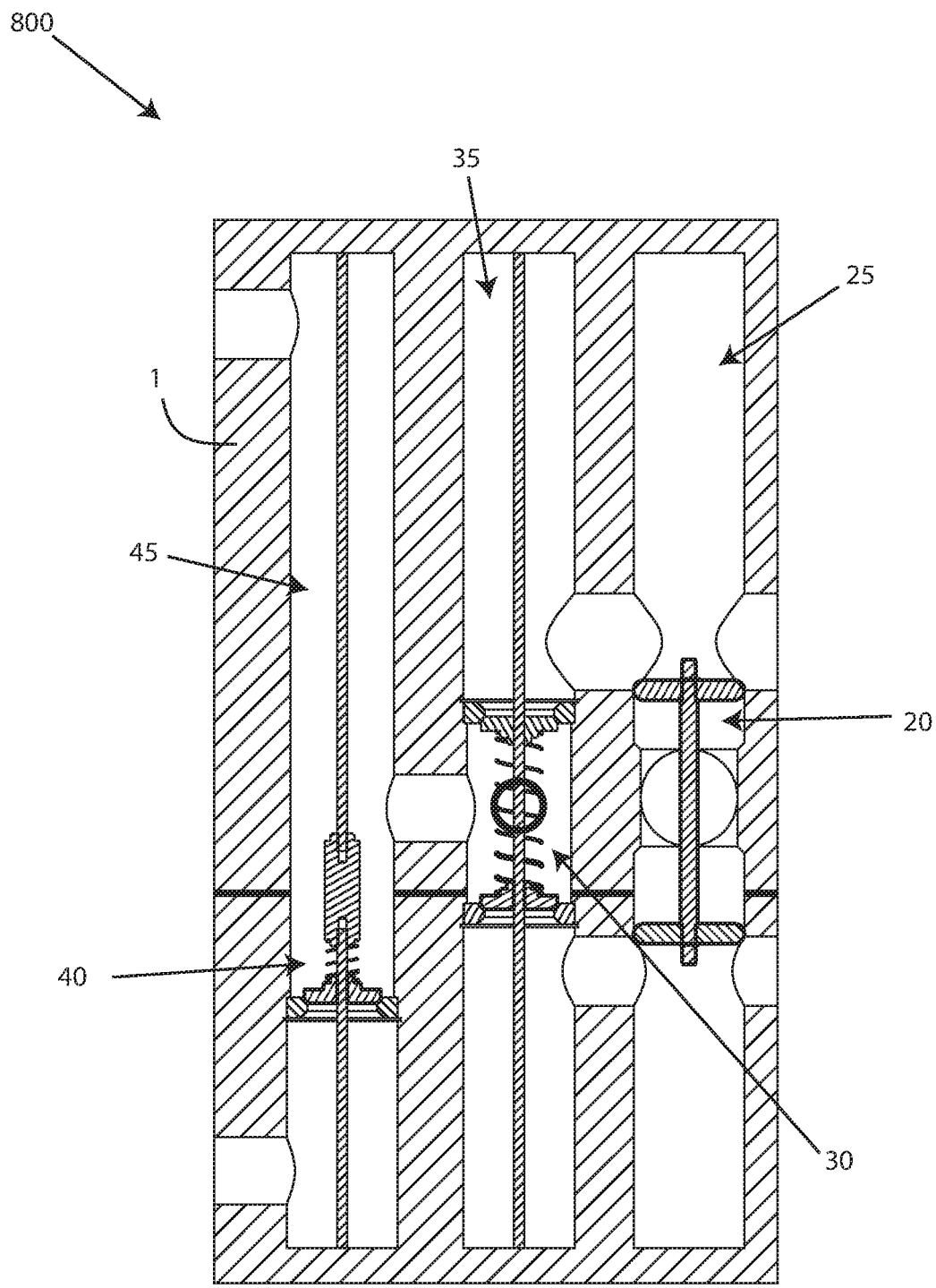
FIG. 16A depicts an exemplary embodiments of an integrated oil system manifold with a housing that is split.
Figure 16B:
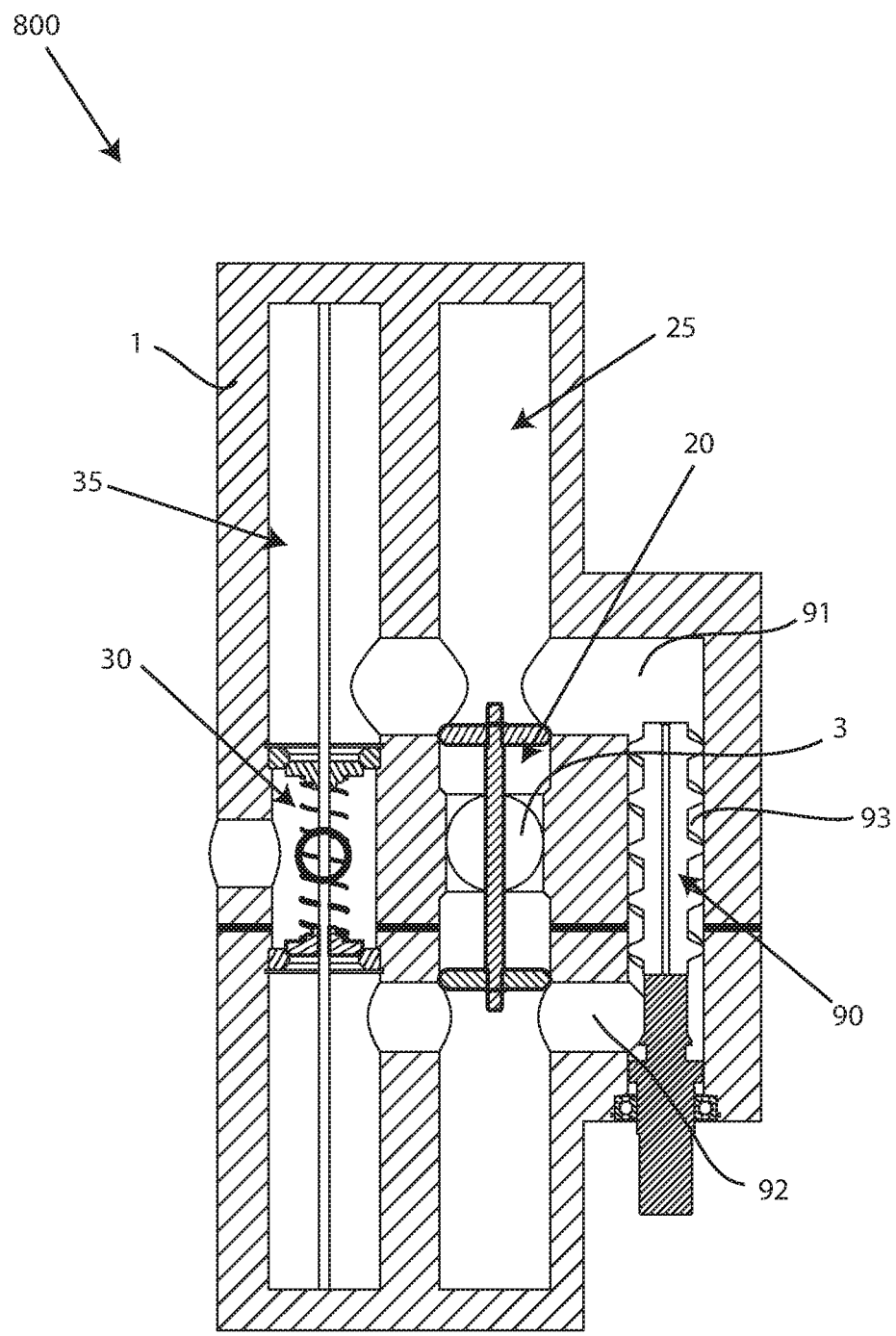
FIG. 16B depicts an exemplary embodiments of an integrated oil system manifold with a housing that is split.

Referring to FIGS. 16A and 16B, exemplary embodiments of an integrated oil system manifold 800 are shown with a housing 1 that is split so there is no need for separate end caps enclosing fluid pathways 25, 35 and 45. This disclosure applies equally if the housing 1 is split perpendicular to one of these fluid pathways, as shown in FIGS. 16A and 16B. The ends of fluid pathways 25, 35 and 45 may be integral with housing 1. The housing 1 may be made of a plurality of pieces, and then assembled and held together with screws, bolts, clamps or the like. FIGS. 16A and 16B merely show exemplary embodiments of a split housing; splitting the housing in this manner or a similar manner can apply equally to all embodiments of the invention, including all of the embodiments depicted in the Figures.

Referring now to FIGS. 1-16B, a method may include the steps of providing an integrated oil system manifold 100, 200, 300, 400, 500, 600, 700. The integrated oil system manifold may include a reverse rotation protection element 20, a main pump check valve 30, and any combination of an auxiliary pump check valve 40, a pressure relief valve 9, thermostat element 60, a heat exchanger 70, a filter assembly 80, an integral main pump assembly 90 and an integral auxiliary pump assembly 97 which are integrated with a housing 1 of the integrated oil system manifold 100, 200, 300, 400, 500, 600, 700.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

What is claimed is:

1. An integrated oil system manifold, comprising:
   a reverse rotation protection element;
   a main pump check valve;
   an auxiliary pump check valve; and
   a pressure relief valve;
   wherein the main pump check valve, the auxiliary pump check valve, the pressure relief valve, and the reverse rotation protection element are integrated within a housing of the integrated oil system manifold.

2. The integrated oil system manifold of claim 1, further comprising at least one thermostatic element integrated with the housing.

3. The integrated oil system manifold of claim 1, further comprising a heat exchanger integrated with the housing.

4. The integrated oil system manifold of claim 1, further comprising a filter assembly integrated with the housing.

5. The integrated oil system manifold of claim 1, further comprising a pump assembly, integrated within the housing, which is driven independently of a machine that receives lubricating oil from the integrated oil system manifold.

6. The integrated oil system manifold of claim 1, further comprising a pump assembly, integrated within the housing, which is driven by a machine that receives lubricating oil from the integrated oil system manifold.

7. The integrated oil system manifold of claim 6, wherein the machine is a centrifugal compressor.

8. An integrated oil system manifold, comprising:
   a reverse rotation protection element;
   a main pump check valve;
   a pump assembly;

wherein the main pump check valve, the reverse rotation protection element and the pump assembly are integrated within a housing of the integrated oil system manifold.

9. The integrated oil system manifold of claim 8, further comprising at least one thermostatic element integrated with the housing.

10. The integrated oil system manifold of claim 8, further comprising a heat exchanger integrated with the housing.

11. The integrated oil system manifold of claim 8, further comprising a filter assembly integrated with the housing.

12. The integrated oil system manifold of claim 8, further comprising a pressure relief valve integrated with the housing.

13. The integrated oil system manifold of claim 8, wherein the pump assembly is driven independently of a machine that the integrated oil system manifold supplies lubricating oil.

14. The integrated oil system manifold of claim 8, wherein the pump assembly is driven by a machine that the integrated oil system manifold supplies lubricating oil.

15. The integrated oil system manifold of claim 14, wherein the machine is a centrifugal compressor.

16. A method for delivering lubrication oil to a machine, the method comprising:
integrating a reverse rotation protection element, a main pump check valve, an auxiliary pump check valve, a pressure relief valve within a single housing, the housing being in fluid communication with the machine, in an operable position;
wherein actuation of a pump assembly associated with the housing supplies a lubrication oil to the machine, the lubrication oil flowing through the housing.

17. The method of claim 16, wherein the pump assembly is actuated by a driving mechanism of the machine.

18. The method of claim 16, wherein the pump assembly is actuated by a driving mechanism independent of the machine.

19. The method of claim 16, wherein the machine is a centrifugal compressor.

20. The method of claim 16, further comprising: integrating at least one thermostatic element to the housing.

* * * * *